(12) United States Patent
Weber et al.

(10) Patent No.: US 9,055,234 B2
(45) Date of Patent: **\*Jun. 9, 2015**

(54) NAVIGABLE TELEPRESENCE METHOD AND SYSTEM

(71) Applicant: Kewazinga Corp., Wilton, CT (US)

(72) Inventors: Andrew H. Weber, New York, NY (US); Scott Sorokin, New York, NY (US); David C. Worley, Wilton, CT (US)

(73) Assignee: KEWAZINGA CORP., Wilton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/505,208

(22) Filed: Oct. 2, 2014

(65) Prior Publication Data
US 2015/0015660 A1   Jan. 15, 2015

Related U.S. Application Data

(63) Continuation of application No. 13/949,132, filed on Jul. 23, 2013, which is a continuation of application No. 12/610,188, filed on Oct. 30, 2009, now abandoned, which is a continuation of application No.

(Continued)

(51) Int. Cl.
*G06F 3/048* (2013.01)
*H04N 5/265* (2006.01)
(Continued)

(52) U.S. Cl.
CPC ............ *H04N 5/265* (2013.01); *G06F 3/04815* (2013.01); *G03B 37/04* (2013.01); *H04N 5/2259* (2013.01); *H04N 5/2627* (2013.01); *H04N 7/181* (2013.01); *H04N 7/185* (2013.01); *H04N 13/0051* (2013.01); *H04N 13/0055* (2013.01); *H04N 13/0059* (2013.01); *H04N 13/0239* (2013.01); *H04N 13/0242* (2013.01);
(Continued)

(58) Field of Classification Search
CPC ... G06F 3/04815; G06F 3/011; H04N 5/2259; H04N 7/181; H04N 13/0059; H04N 5/262
USPC ................................ 715/850–852; 348/14.03
See application file for complete search history.

(56) References Cited

U.S. PATENT DOCUMENTS

| 5,559,707 A | 9/1996 | DeLorme et al. |
| 5,802,492 A | 9/1998 | DeLorme et al. |

(Continued)

OTHER PUBLICATIONS

Declaration of Marilyn McSweeney and Exhibits, from *Walker Digital LLC* vs. *Google, Inc., et al.*, Civil Action No. 11-cv-309-SLR (D. Mass.), Docket Entry 330.

(Continued)

*Primary Examiner* — Tadeese Hailu
(74) *Attorney, Agent, or Firm* — Stroock & Stroock & Lavan LLP

(57) ABSTRACT

Methods and systems permit one or more users to navigate through imagery of an environment. The system may include a first user interface device having first user inputs associated with first movement through the environment and a second user interface device having second user inputs associated with a second movement through the environment. Thus, a first user and a second user are able to navigate simultaneously and independently. In certain embodiments the system processes imagery of the environment to smooth user navigation through the environment.

30 Claims, 13 Drawing Sheets

Related U.S. Application Data

11/359,233, filed on Feb. 21, 2006, now Pat. No. 7,613,999, which is a continuation of application No. 10/308,230, filed on Dec. 2, 2002, now abandoned, which is a continuation of application No. 09/419,274, filed on Oct. 15, 1999, now Pat. No. 6,522,325, which is a continuation-in-part of application No. 09/283,413, filed on Apr. 1, 1999, now Pat. No. 6,535,226.

(60) Provisional application No. 60/080,413, filed on Apr. 2, 1998.

(51) Int. Cl.
  *G06F 3/0481* (2013.01)
  *G03B 37/04* (2006.01)
  *H04N 5/225* (2006.01)
  *H04N 5/262* (2006.01)
  *H04N 7/18* (2006.01)
  *H04N 13/00* (2006.01)
  *H04N 13/02* (2006.01)
  *G06F 3/01* (2006.01)
  *H04N 7/14* (2006.01)
  *H04N 7/15* (2006.01)

(52) U.S. Cl.
  CPC ........ *H04N13/0246* (2013.01); *H04N 13/0296* (2013.01); *G06F 3/011* (2013.01); *H04N 5/262* (2013.01); *H04N 7/142* (2013.01); *H04N 5/2624* (2013.01); *H04N 7/15* (2013.01)

(56) References Cited

U.S. PATENT DOCUMENTS

| | | |
|---|---|---|
| 5,926,118 A | 7/1999 | Hayashida et al. |
| 6,195,122 B1 | 2/2001 | Vincent |
| 6,282,362 B1 | 8/2001 | Murphy et al. |

OTHER PUBLICATIONS

Excerpts from the Deposition of Michael Naimark from *Walker Digital LLC* vs. *Google, Inc., et al.*, Civil Action No. 11-cv-309-SLR (D. Mass.), Docket Entry 330.

The Rand McNally Photo-Auto Guide, Chicago to Milwaukee, Milwaukee to Chicago, Rand McNally & Company (1909).

Robert Mohl, "Cognitive Space in the Interactive Movie Map: An Investigation of Spatial Learning in Virtual Environments," pp. 1-226, Massachusetts Institute of Technology, Cambridge, MA.

Andrew Lippmann, "Movie-Maps: An application of the Optical Videodisc to Computer Graphics", pp. 32-42, Massachusetts Institute of Technology, Cambridge, MA.

Steven Yelick, Anamorphic Image Processing, Massachusetts Institute of Technology, Cambridge, MA.

The Interactive Movie Map, A Surrogate Travel System, Massachusetts Institute of Technology, Cambridge, MA; Video available at http://www.youtube.com/watch?v=Hf6LkqgXPMU.

The Interactive Movie Map, A Surrogate Travel System, Massachusetts Institute of Technology, Cambridge, MA; Video available at http://www.youtube.com/watch?v=w18MyqszlYc.

Video available at https://www.youtube.com/watch?v=X50j4S_x2Cc.

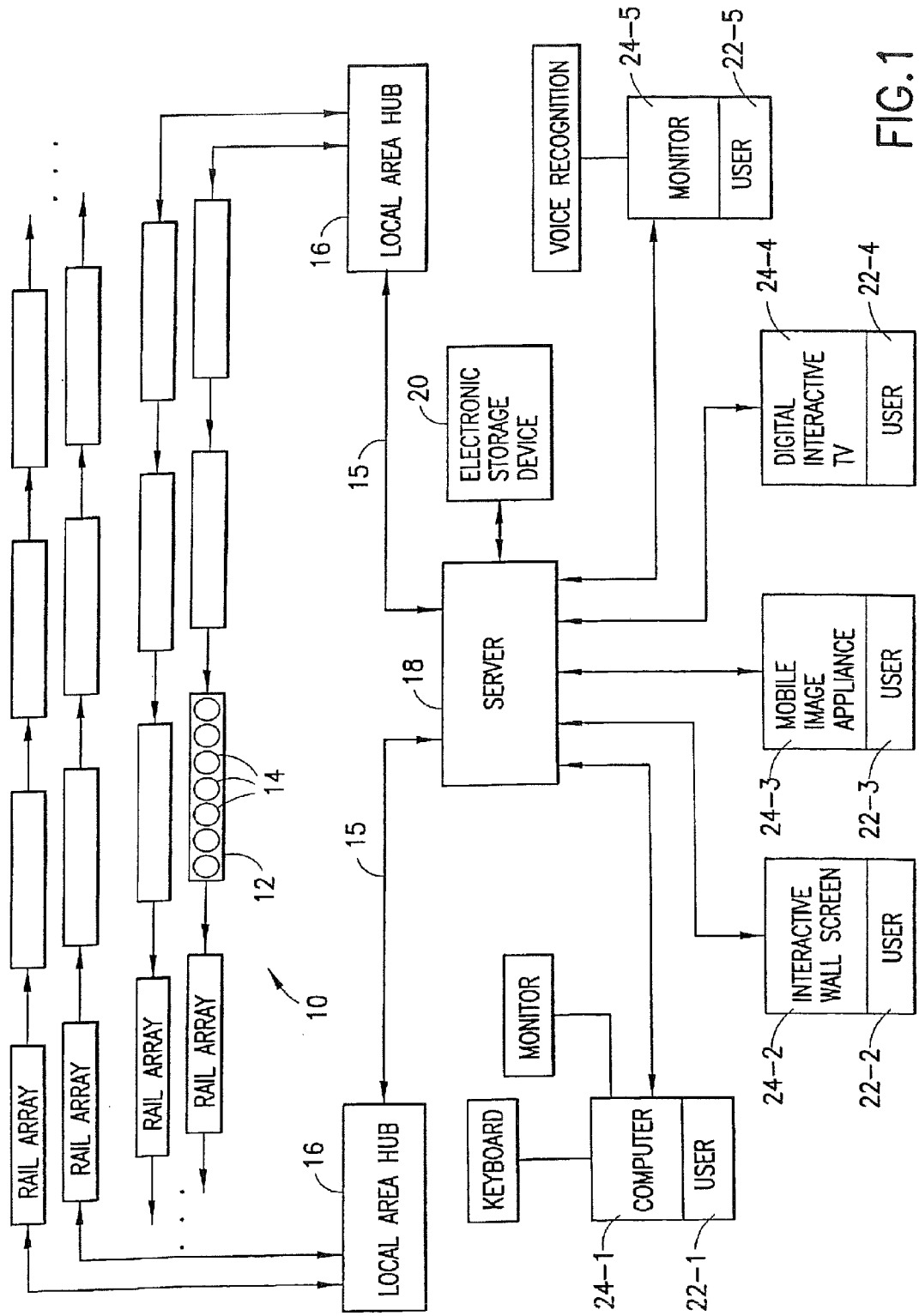

NAVIGABLE TELEPRESENCE METHOD AND SYSTEM

CROSS-REFERENCE TO RELATED APPLICATIONS

This application is a continuation of and claims priority under 35 U.S.C. §120 to commonly assigned pending U.S. patent application Ser. No. 13/949,132, filed Jul. 23, 2013, which is a continuation of U.S. patent application Ser. No. 12/610,188, filed on Oct. 30, 2009, which is a continuation of U.S. patent application Ser. No. 11/359,233, filed Feb. 21, 2006, which issued as U.S. Pat. No. 7,613,999, which is a continuation of U.S. patent application Ser. No. 10/308,230, filed on Dec. 2, 2002, which is a continuation of and claims priority under 35 U.S.C. §120 to U.S. patent application Ser. No. 09/419,274, filed on Oct. 15, 1999, which issued as U.S. Pat. No. 6,522,325, which is a continuation-in-part of and claims priority under 35 U.S.C. §120 to U.S. patent application Ser. No. 09/283,413, filed on Apr. 1, 1999, which issued as U.S. Pat. No. 6,535,226, which claims the benefit of U.S. Provisional Application Ser. No. 60/080,413, filed on Apr. 2, 1998, all of which are hereby incorporated herein by reference.

BACKGROUND OF THE INVENTION

1. Field of the Invention

The present invention relates generally to telepresence systems and methods.

2. Description of Related Art

In general, a need exists for the development of telepresence systems suitable for use with static venues, such as museums, and dynamic venues or events, such as a music concerts. The viewing of such venues is limited by time, geographical location, and the viewer capacity of the venue. For example, potential visitors to a museum may be prevented from viewing an exhibit due to the limited hours the museum is open. Similarly, music concert producers must turn back fans due to the limited seating of an arena. In short, limited access to venues reduces the revenue generated.

In an attempt to increase the revenue stream from both static and dynamic venues, such venues have been recorded for broadcast or distribution. In some instances, dynamic venues are also broadcast live. While such broadcasting increases access to the venues, it involves considerable production effort. Typically, recorded broadcasts must be cut and edited, as views from multiple cameras are pieced together. These editorial and production efforts are costly.

In some instances, the broadcast resulting from these editorial and production efforts provides viewers with limited enjoyment. Specifically, the broadcast is typically based on filming the venue from a finite number of predetermined cameras. Thus, the broadcast contains limited viewing angles and perspectives of the venue. Moreover, the viewing angles and perspectives presented in the broadcast are those selected by a producer or director during the editorial and production process; there is no viewer autonomy. Furthermore, although the broadcast is often recorded for multiple viewings, the broadcast has limited content life because each viewing is identical to the first. Because each showing looks and sounds the same, viewers rarely come back for multiple viewings.

A viewer fortunate enough to attend a venue in person will encounter many of the same problems. For example, a museum-goer must remain behind the barricades, viewing exhibits from limited angles and perspectives. Similarly, concert-goers are often restricted to a particular seat or section in an arena. Even if a viewer were allowed free access to the entire arena to videotape the venue, such a recording would also have limited content life because each viewing would be the same as the first. Therefore, a need exists for a telepresence system that preferably provides user autonomy while resulting in recordings with enhanced content life at a reduced production cost.

Apparently, attempts have been made to develop telepresence systems to satisfy some of the foregoing needs. One telepresence system is described in U.S. Pat. No. 5,708,469 for Multiple View Telepresence Camera Systems Using A Wire Cage Which Surrounds A Polarity Of Multiple Cameras And Identifies The Fields Of View, issued Jan. 13, 1998. The system disclosed therein includes a plurality of cameras, wherein each camera has a field of view that is space-contiguous with and at a right angle to at least one other camera. In other words, it is preferable that the camera fields of view do not overlap each other. A user interface allows the user to jump between views. In order for the user's view to move through the venue or environment, a moving vehicle carries the cameras.

This system, however, has several drawbacks. For example, in order for a viewer's perspective to move through the venue, the moving vehicle must be actuated and controlled by the viewer. In this regard, operation of the system is complicated. Furthermore, because the camera views are contiguous, typically at right angles, changing camera views results in a discontinuous image.

Other attempts at providing a telepresence system have taken the form of a 360 degree camera systems. One such system is described in U.S. Pat. No. 5,745,305 for Panoramic Viewing Apparatus, issued Apr. 28, 1998. The system described therein provides a 360 degree view of environment by arranging multiple cameras around a pyramid shaped reflective element. Each camera, all of which share a common virtual optical center, receives an image from a different side of the reflective pyramid. Other types of 360 degree camera systems employ a parabolic lens or a rotating camera.

Such 360 degree camera systems also suffer from drawbacks. In particular, such systems limit the user's view to 360 degrees from a given point perspective. In other words, 360 degree camera systems provide the user with a panoramic view from a single location. Only if the camera system was mounted on a moving vehicle remotely controlled by the viewer could the viewer navigate and experience simulated movement through an environment.

U.S. Pat. No. 5,187,571 for Television System For Displaying Multiple Views of A Remote Location issued Feb. 16, 1993, describes a camera system similar to the 360 degree camera systems described above. The system described provides a user to select an arbitrary and continuously variable section of an aggregate field of view. Multiple cameras are aligned so that each camera's field of view merges contiguously with those of adjacent cameras thereby creating the aggregate field of view. The aggregate field of view may expand to cover 360 degrees. In order to create the aggregate field of view, the cameras' views must be contiguous. In order for the camera views to be contiguous, the cameras have to share a common point perspective, or vertex. Thus, like the previously described 360 degree camera systems, the system of U.S. Pat. No. 5,187,571 limits a user's view to a single point perspective, rather than allowing a user to experience movement in perspective through an environment.

Also, with regard to the system of U.S. Pat. No. 5,187,571, in order to achieve the continuity between camera views, a relatively complex arrangement of mirrors is required. Additionally, each camera seemingly must also be placed in the same vertical plane.

Thus, a need still exists for an improved telepresence system that provides the ability to better simulate a viewer's actual presence in a venue, preferably in real time.

3. Summary of Embodiments of the Invention

These and other needs are satisfied by embodiments of the present invention. A telepresence method and system according to one embodiment of the present invention permits one or more users to navigate through imagery of an environment. One such system receives, from a first user interface device associated with the first user, first user inputs associated with the first view through the environment, and receives, from a second user interface device associated with the second user, second user inputs associated with the second view through the environment. The system receives electronic imagery of progressively different perspectives of the environment having overlapping fields of view and generates electronic mosaic imagery from the electronic imagery of the environment. Based on the first user inputs, the system provides to the first user interface device mosaic imagery along the first view, thereby allowing the first user to navigate along the first view of the environment, and based on the second user inputs, provides to the second user interface device mosaic imagery along the second view, thereby allowing the first user and second user to navigate simultaneously and independently along the first view and second view of the environment, respectively. In certain embodiments the system processes the imagery to smooth user navigation through the environment.

BRIEF DESCRIPTION OF THE DRAWINGS

FIG. 1 is an overall schematic of one embodiment of the present invention.

FIGS. 7b-7g illustrate views from the perspectives of selected cameras of the array in FIG. 7a.

DESCRIPTION OF CERTAIN EMBODIMENTS

1. General Description of Preferred Embodiments

Figure 2A:
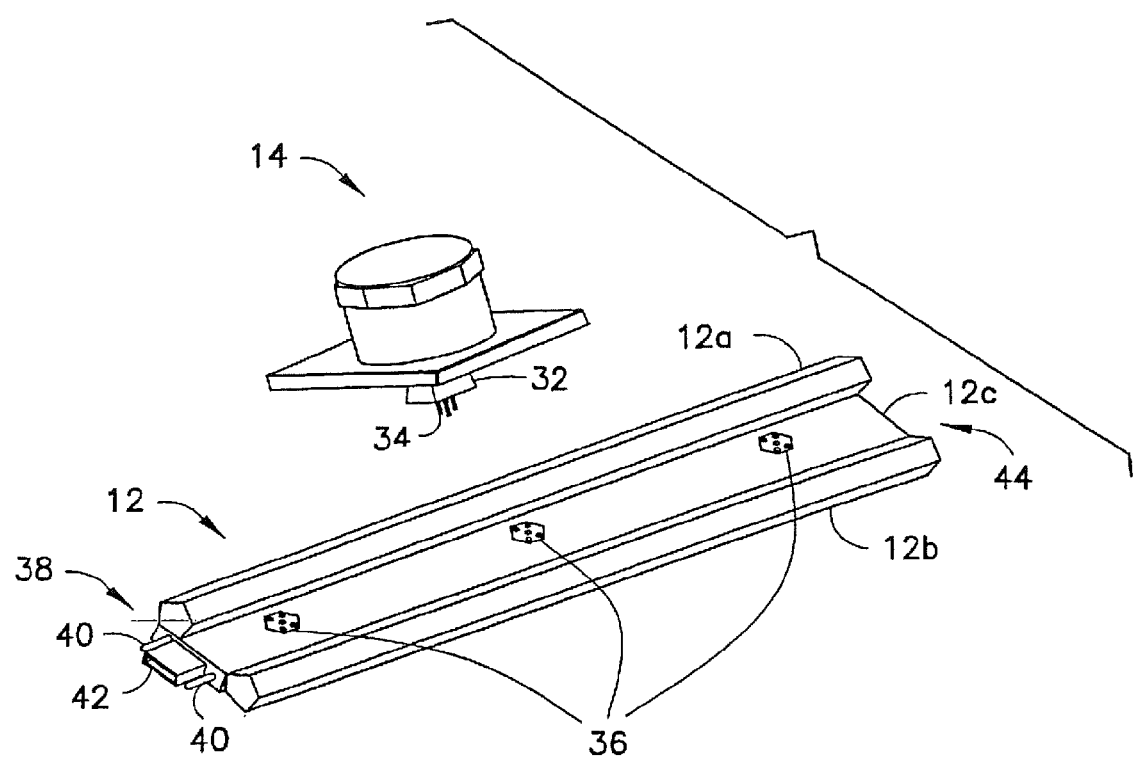
FIG. 2a is a perspective view of a camera and a camera rail section of the array according to one embodiment of the present invention.
Figures 2B, 2C, 2D:
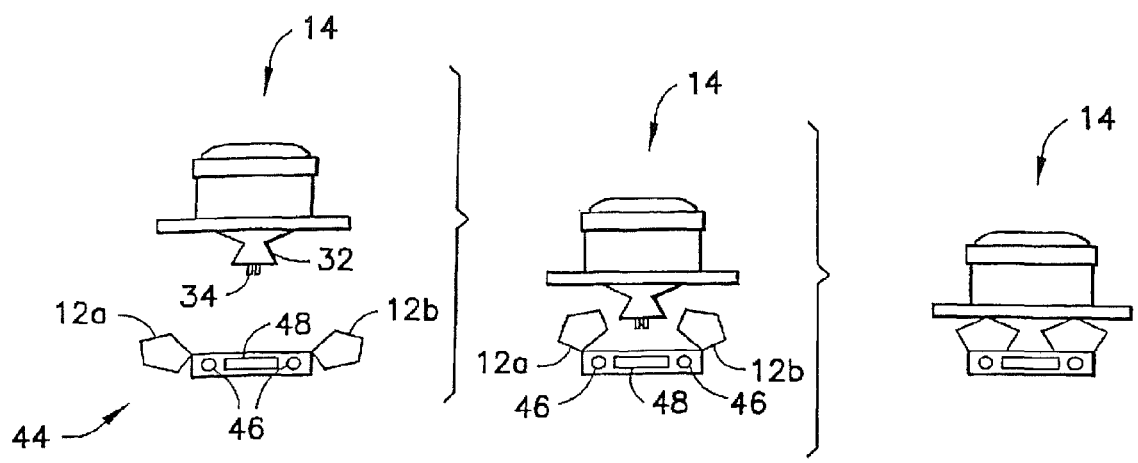
FIGS. 2b-2d are side plan views of a camera and a camera rail according to one embodiment of the present invention.
Figure 2E:
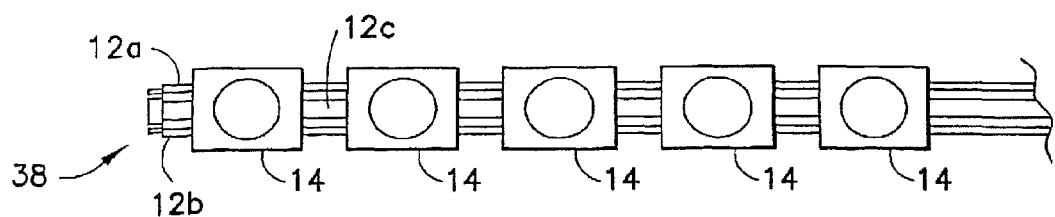
FIG. 2e is a top plan view of a camera rail according to one embodiment of the present invention.

The present invention relates to a telepresence system that, in a preferred embodiments, uses modular, interlocking arrays of microcameras. The cameras are on rails, with each rail holding a plurality of cameras. These cameras, each locked in a fixed relation to every adjacent camera on the array and dispersed dimensionally in a given environment, transmit image output to an associated storage node, thereby enabling remote viewers to navigate through such environment with the same moving light reflections and shadows) that characterize an actual in-environment transit.

In another preferred embodiment, the outputs of these microcameras are linked by tiny (less than half the width of a human hair) Vertical Cavity Surface Emitting Lasers (VC-SELs), or alternatively any photonic or optoelectric throughput device, to optical fibers, fed through area net hubs, buffered on server arrays or server farms (either for recording or (instantaneous) relay) and sent to viewers at remote terminals, interactive wall screens, or mobile image appliances (like Virtual Retinal Displays). Each remote viewer, through an intuitive graphical user interface (GUI), can navigate effortlessly through the environment, enabling seamless movement through the event.

This involves a multiplexed, electronic, photonic, optoelectronic, or any data throughput-configured switching process (invisible to the viewer) which moves the viewer's point perspective from camera to camera. Rather than relying, per se, on physically moving a microcamera through space (i.e., vesting a viewer with control of a vehicle carrying one or more cameras), the system uses the multiplicity of positioned microcameras to move the viewer's perspective from microcamera node to adjacent microcamera node in a way that provides the viewer with a sequential visual and acoustical path throughout the extent of the array. This allows the viewer to fluidly track or dolly through a 3-dimensional remote environment, to move through an event and make autonomous real-time decisions about where to move and when to linger.

Instead of vesting the viewer with the capacity to physically move a robotic camera or vehicle on which the camera or cameras are mounted, which would immediately limit the number of viewers that could simultaneously control their own course, one or more viewers can navigate via storage nodes containing images of an environment associated with a pre-existing array of cameras. The user can move around the environment in any direction—clockwise or counterclockwise, up, down, closer to or further away from the environment, or some combination thereof. Moreover, image output mixing, such as mosaicing and tweening, effectuates seamless motion throughout the environment.

2. Detailed Description Of Preferred Embodiments

Certain embodiments of the present invention will now be described in greater detail with reference to the drawings. It is understood that the operation and functionality of many of the components of the embodiments described herein are known to one skilled in the art and, as such, the present description does not go into detail into such operative and functionality.

A telepresence system 100 according to the present invention is shown in FIG. 1. The telepresence system 100 generally includes an array 10 of cameras 14 coupled to a server 18, which in turn is coupled to one or more users 22 each having a user interfaced/display device 24. As will be understood to one skilled it the art, the operation and functionality of the embodiment described herein is provided, in part, by the server and user interface/display device. While the operation of these components is not described by way of particular code listings or logic diagrams, it is to be understood that one skilled in the art will be able to arrive at suitable implementations based on the functional and operational details provided herein. Furthermore, the scope of the present invention is not to be construed as limited to any particular code or logic implementation.

In the present embodiment, the camera array 10 is conceptualized as being in an X, Z coordinate system. This allows each camera to have an associated, unique node address comprising an X, and Z coordinate (X, Z). In the present embodiment, for example, a coordinate value corresponding to an axis of a particular camera represents the number of camera positions along that axis the particular camera is displaced from a reference camera. In the present embodiment, from the user's perspective the X axis runs left and right, and the Z axis runs down and up. Each camera 14 is identified by its X, Z coordinate. It is to be understood, however, that other methods of identifying cameras 14 can be used. For example, other coordinate systems, such as those noting angular displacement from a fixed reference point as well as coordinate systems that indicate relative displacement from the current camera node may be used. In another alternate embodiment, the array is three dimensional, located in an X, Y, Z coordinate system.

The array 10 comprises a plurality of rails 12, each rail 12 including a series of cameras 14. In the present preferred embodiment, the cameras 14 are microcameras. The output from the microcameras 14 are coupled to the server 18 by means of local area hubs 16. The local area hubs 16 gather the outputs and, when necessary, amplify the outputs for transmission to the server 18. In an alternate embodiment, the local area hubs 16 multiplex the outputs for transmission to the server 18. Although the figure depicts the communication links 15 between the camera 14 and the server 18 as being hardwired, it is to be understood that wireless links may be employed. Thus, it is within the scope of the present invention for the communication links 15 to take the form of fiber optics, cable, satellite, microwave transmission, internet, and the like.

Also coupled to the server 18 is an electronic storage device 20. The server 18 transfers the outputs to the electronic storage device 20. The electronic (mass) storage device 20, in turn, transfers each camera's output onto a storage medium or means, such as CD-ROM, DVD, tape, platter, disk array, or the like. The output of each camera 14 is stored in a particular location on the storage medium associated with that camera 14 or is stored with an indication to which camera 14 each stored output corresponds. For example, the output of each camera 14 is stored in contiguous locations on a separate disk, tape, CD-ROM, or platter. As is known in the art, the camera output may be stored in a compressed format, such as JPEG, MPEG1, MPEG2, and the like. Having stored each output allows a user to later view the environment over and over again, each time moving through the array 10 in a new path, as described below. In some embodiments of the present invention, such as those providing only real-time viewing, no storage device is required.

As will be described in detail below, the server 18 receives output from the cameras 14 in the array. The server 18 processes these outputs for either storage in the electronic storage device 20, transmission to the users 22 or both.

It is to be understood that although the server 18 is configured to provide the functionality of the system 100 in the present embodiment, it is to be understood that other processing elements may provide the functionality of the system 100. For example, in alternate embodiments, the user interface device is a personal computer programmed to interpret the user input and transmit an indication of the desired current node address, buffer outputs from the array, and provide other of the described functions.

As shown, the system 100 can accommodate (but does not require) multiple users 22. Each user 22 has associated therewith a user interface device including a user display device (collectively 24). For example, user 22-1 has an associated user interface device and a user display device in the form of a computer 24-1 having a monitor and a keyboard. User 22-2 has associated therewith an interactive wall screen 24-2 which serves as a user interface device and a user display device. The user interface device and the user display device of user 22-3 includes a mobile audio and image appliance 24-3. A digital interactive TV 24-4 is the user interface device and user display device of user 22-4. Similarly, user 22-5 has a voice recognition unit and monitor 24-5 as the user interface and display devices. It is to be understood that the foregoing user interface devices and user display devices are merely exemplary; for example, other interface devices include a mouse, touch screen, biofeedback devices, as well as those identified in U.S. Provisional Patent Application Ser. No. 60/080,413 and the like.

As described in detail below, each user interface device 24 has associated therewith user inputs. These user inputs allow each user 22 to move or navigate independently through the array 10. In other words, each user 22 enters inputs to generally select which camera outputs are transferred to the user display device. Preferably, each user display device includes a graphical representation of the array 10. The graphical representation includes an indication of which camera in the array the output of which is being viewed. The user inputs allow each user to not only select particular cameras, but also to select relative movement or navigational paths through the array 10.

As shown in FIG. 1, each user 22 may be coupled to the server 18 by an independent communication link. Furthermore, each communication link may employ different technology. For example, in alternate embodiments, the communication links include an internet link, a microwave signal link, a satellite link, a cable link, a fiber optic link, a wireless link, and the like.

It is to be understood that the array 10 provides several advantages. For example, because the array 10 employs a series of cameras 14, no individual camera, or the entire array 10 for that matter, need be moved in order to obtain a seamless view of the environment. Instead, the user navigates through the array 10, which is strategically placed through and around the physical environment to be viewed. Furthermore, because the cameras 14 of the array 10 are physically located at different points in the environment to be viewed, a user is able to view changes in perspective, a feature unavailable to a single camera that merely changes focal length.

Microcameras

Each camera 14 is preferably a microcamera. The microcameras—microlenses mounted on thumbnail-sized CMOS active pixel sensor (APS) microchips—are arranged in patterns that enable viewers to move radically, in straight lines, or in fluid combinations thereof. The cameras are produced in a mainstream manufacturing process, by several companies, including Photobit, Pasadena, Calif.; Sarnoff Corporation, Princeton, N.J.; and VLSI Vision, Ltd., Edinburgh, Scotland.

Structure of the Array

The structure of the array 10 will now be described in greater detail with reference to FIGS. 2a-2e. In general, the camera array 10 of the present embodiment comprises a series of modular rails 12 carrying microcameras 14. The structure of the rails 12 and cameras 14 will now be discussed in greater detail with reference to FIGS. 2a through 2d. Each camera 14 includes registration pins 34. In the preferred embodiment, the cameras 14 utilize VCSELs to transfer their outputs to the rail 12. It is to be understood that the present invention is not limited to any particular type of camera 14, however, or even to an array 10 consisting of only one type of camera 14.

Each rail 12 includes two sides, 12a, 12b, at least one of which 12b is hingeably connected to the base 12c of the rail 12. The base 12c includes docking ports 36 for receiving the registration pins 34 of the camera 14. When the camera 14 is seated on a rail 12 such that the registration pins 34 are fully engaged in the docking ports 36, the hinged side 12b of the rail 12 is moved against the base 32 of the camera 14, thereby securing the camera 14 to the rail 12.

Each rail 12 further includes a first end 38 and a second end 44. The first end 38 includes, in the present embodiment, two locking pins 40 and a protected transmission relay port 42 for transmitting the camera outputs. The second end 44 includes two guide holes 46 for receiving the locking pins 40, and a transmission receiving port 48. Thus, the first end 38 of one rail 12 is engagable with a second end 44 of another rail 12. Therefore, each rail 12 is modular and can be functionally connected to another rail to create the array 10.

Once the camera 14 is securely seated to the rail 12, the camera 14 is positioned such that the camera output may be transmitted via the VCSEL to the rail 12. Each rail 12 includes communication paths for transmitting the output from each camera 14.

Although the array 10 is shown having a particular configuration, it is to be understood that virtually any configuration of rails 12 and cameras 14 is within the scope of the present invention. For example, the array 10 may be a linear array of cameras 14, a 2-dimensional array of cameras 14, a 3-dimensional array of cameras 14, or any combination thereof. Furthermore, the array 10 need not be comprised solely of linear segments, but rather may include curvilinear sections.

The array 10 is supported by any of a number of support means. For example, the array 10 can be fixedly mounted to a wall or ceiling; the array 10 can be secured to a moveable frame that can be wheeled into position in the environment or supported from cables.

Figure 3:
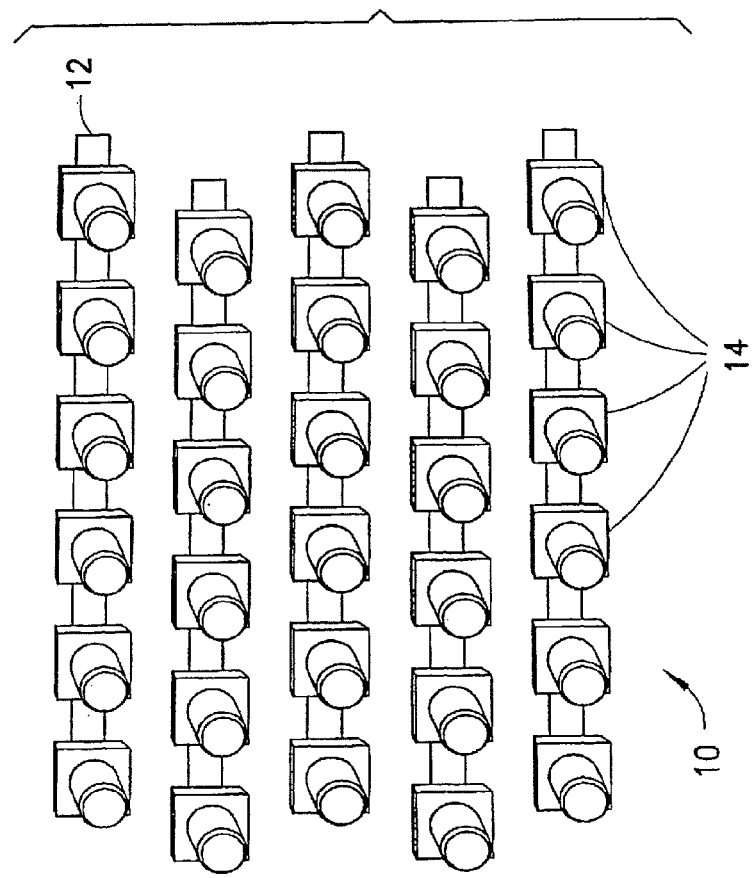
FIG. 3 is a perspective view of a portion of the camera array according to one embodiment of the present invention.

FIG. 3 illustrates an example of a portion of the array 10. As shown, the array 10 comprises five rows of rails 12a, through 12e. Each of these rails 12a-12e is directed towards a central plane, which substantially passes through the center row 12c. Consequently, for any object placed in the same plane as the middle row 12c, a user would be able to view the object essentially from the bottom, front, and top.

Figure 4:
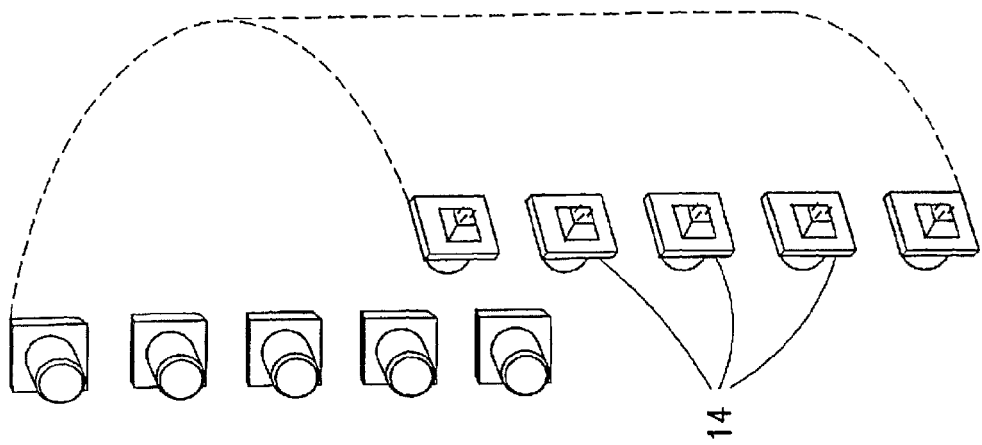
FIG. 4 is a perspective view of a portion of the camera array according to an alternate embodiment of the present invention.

As noted above, the rails 12 of the array 10 need not have the same geometry. For example, some of the rails 12 may be straight while others may be curved. For example, FIG. 4 illustrates the camera alignment that results from utilizing curved rails. It should be noted that rails in FIG. 4 have been made transparent so that the arrangement of cameras 14 may be easily seen.

In an alternate embodiment, each rail is configured in a step-like fashion or an arc with each camera above (or below) and in front of a previous camera. In such an arrangement, the user has the option of moving forward through the environment.

It is to be understood that the spacing of the microcameras 14 depends on the particular application, including the objects being viewed, the focal length of the microcameras 14, and the speed of movement through the array 10. In one embodiment the distance between microcameras 14 can be approximated by analogy to a conventional movie reel recording projector. In general, the speed of movement of a projector through an environment divided by the frames per unit of time second results in a frame-distance ratio.

For example, as shown by the following equations, in some applications a frame is taken ever inch. A conventional movie projector records twenty-four frames per second. When such a projector is moved through an environment at two feet per second, a frame is taken approximately every inch.

2ft÷24 frames=2 ft=1 ft=12 inches=sec sec 24 frames 12 frames 12 frames 1 inch=1 frame per inch.

1 frame

A frame of the projector is analogous to a camera 14 in the present invention. Thus, where one frame per inch results in a movie having a seamless view of the environment, so too does one camera 14 per inch. Thus, in one embodiment of the present invention the cameras 14 are spaced approximately one inch apart, thereby resulting in a seamless view of the environment.

Navigation Through the System

The general operation of the present embodiment will now be described with reference to FIG. 5 and continuing reference to FIG. 1. As shown in step 110, the user is presented with a predetermined starting view of the environment corresponding to a starting camera. It is to be understood that the operation of the system is controlled, in part, by software residing in the server. As noted above, the system associates each camera in the array with a coordinate. Thus, the system is able to note the coordinates of the starting camera node. The camera output and, thus the corresponding view, changes only upon receiving a user input.

When the user determines that they want to move or navigate through the array, the user enters a user input through the user interface device 24. As described below, the user inputs of the present embodiment generally include moving to the right, to the left, up, or down in the array. Additionally, a user may jump to a particular camera in the array. In alternate embodiments, a subset of these or other inputs, such as forward, backward, diagonal, over, and under, are used. The user interface device, in turn, transmits the user input to the server in step 120.

Next, the server receives the user input in step 130 and proceeds to decode the input. In the present embodiment, decoding the input generally involves determining whether the user wishes to move to the right, to the left, up, or down in the array.

On the other hand, if the received user input does not correspond to backward, then the server 18 proceeds to determine whether the input corresponds to moving to the user's right in the array 10. This determination is shown in step 140. If the received user input does correspond to moving to the right, the current node address is incremented along the X axis in step 150 to obtain an updated address.

If the received user input does not correspond to moving to the right in the array, the server 18 then determines whether the input corresponds to moving to the user's left in the array 10 in step 160. Upon determining that the input does correspond to moving to the left, the server 18 then decrements the current node address along the X axis to arrive at the updated address. This is shown in step 170.

If the received user input does not correspond to either moving to the right or to the left, the server 18 then determines whether the input corresponds to moving up in the array. This determination is made in step 180. If the user input corresponds to moving up, in step 190, the server 18 increments the current node address along the Z axis, thereby obtaining an updated address.

Next, the server 18 determines whether the received user input corresponds to moving down in the array 10. This determination is made in step 200. If the input does correspond to moving down in the array 10, in step 210 the server 18 decrements the current node address along the Z axis.

Lastly, in step 220 the server 18 determines whether the received user input corresponds to jumping or changing the view to a particular camera 14. As indicated in FIG. 5, if the input corresponds to jumping to a particular camera 14, the server 18 changes the current node address to reflect the desired camera position. Updating the node address is shown as step 230. In an alternate embodiment, the input corresponds to jumping to a particular position in the array 10, not identified by the user as being a particular camera but by some reference to the venue, such as stage right.

It is to be understood that the server 18 may decode the received user inputs in any of a number of ways, including in any order. For example, in an alternate embodiment the server 18 first determines whether the user input corresponds to up or down. In another alternate, preferred embodiment, user navigation includes moving forward, backward, to the left and right, and up and down through a three dimensional array.

If the received user input does not correspond to any of the recognized inputs, namely to the right, to the left, up, down, or jumping to a particular position in the array 10 then in step 240, the server 18 causes a message signal to be transmitted to the user display device 24, causing a message to be displayed to the user 22 that the received input was not understood. Operation of the system 100 then continues with step 120, and the server 18 awaits receipt of the next user input.

After adjusting the current node address, either by incrementing or decrementing the node address along an axis or by jumping to a particular node address, the server 18 proceeds in step 250 to adjust the user's view. Once the view is adjusted, operation of the system 100 continues again with step 120 as the server 18 awaits receipt of the next user input.

In an alternate embodiment, the server 18 continues to update the node address and adjust the view based on the received user input. For example, if the user input corresponded to "moving to the right", then operation of the system 100 would continuously loop through steps 140, 150, and 250, checking for a different input. When the different input is received, the server 18 continuously updates the view accordingly.

It is to be understood that the foregoing user inputs, namely, to the right, to the left, up, and down, are merely general descriptions of movement through the array. Although the present invention is not so limited, in the present preferred embodiment, movement in each of these general directions is further defined based upon the user input.

Figure 5:
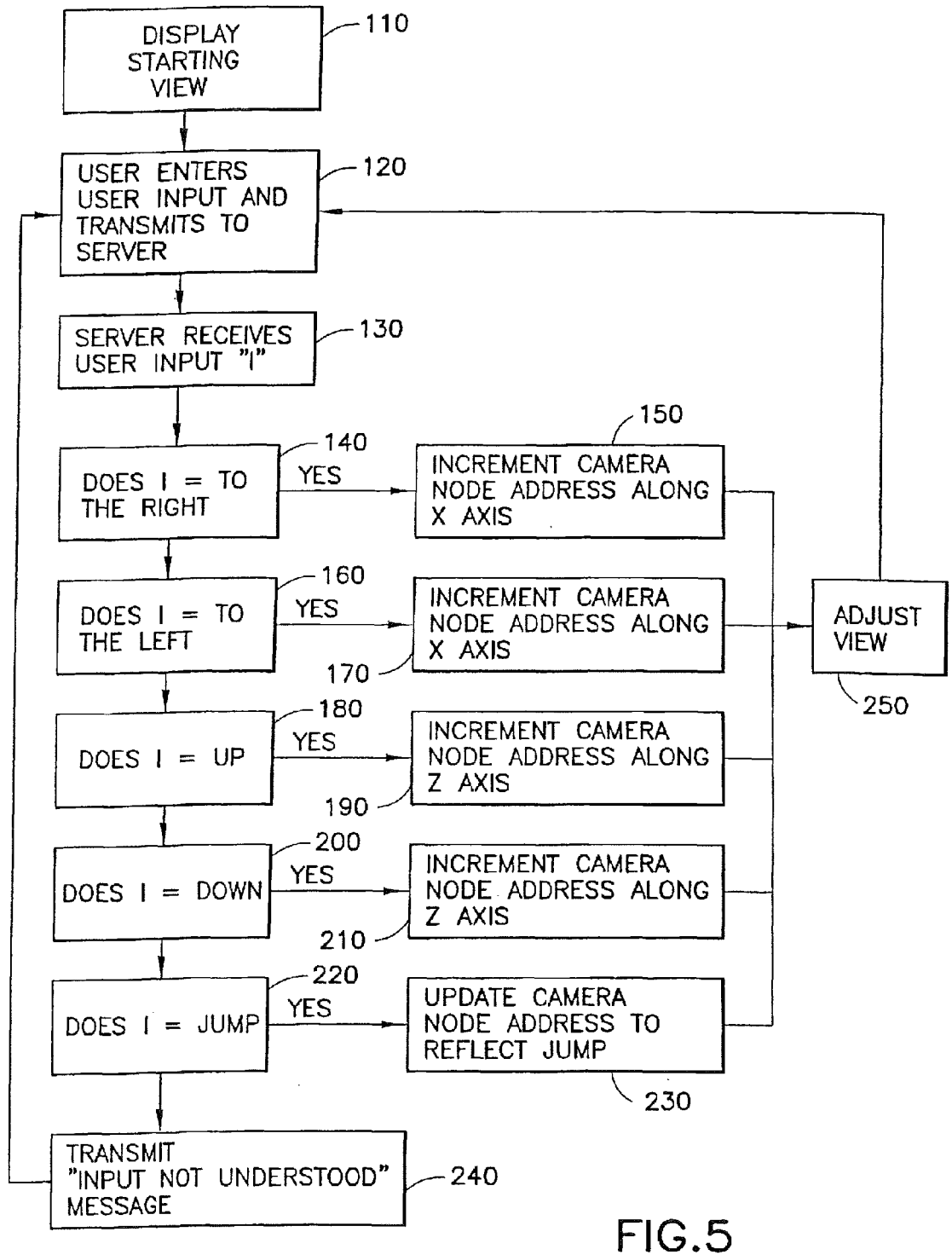
FIG. 5 is a flowchart illustrating the general operation of the user interface according to one embodiment of the present invention.
Figure 6:
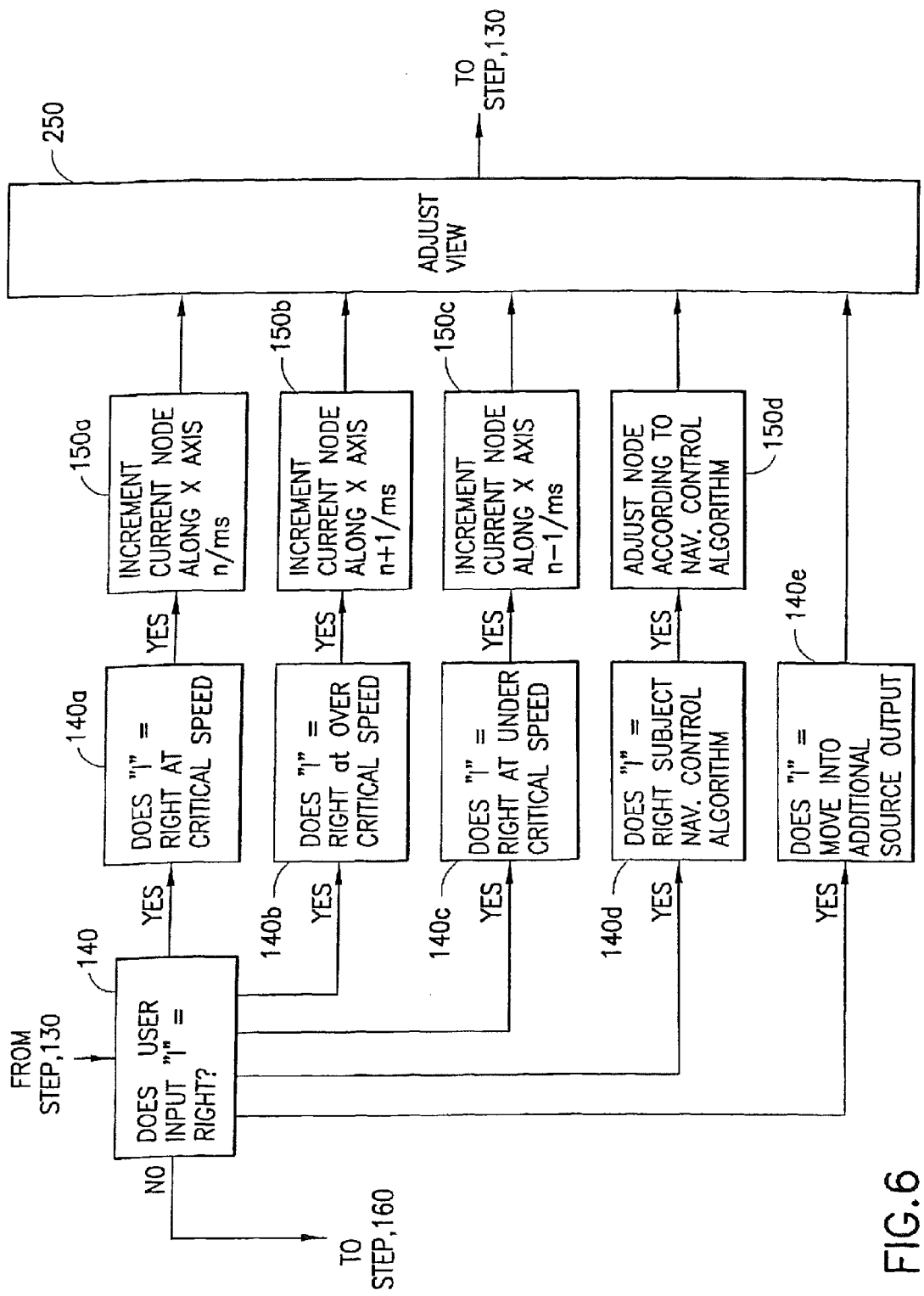
FIG. 6 is a flowchart illustrating in detail a portion of the operation shown in FIG. 5.

Accordingly, FIG. 6 is a more detailed diagram of the operation of the system according to steps 140, 150, and 250 of FIG. 5. Moreover, it is to be understood that while FIG. 6 describes more detailed movement one direction i.e., to the right, the same detailed movement can be applied in any other direction. As illustrated, the determination of whether the user input corresponds to moving to the right actually involves several determinations. As described in detail below, these determinations include moving to the right through the array 10 at different speeds, moving to the right into a composited additional source output at different speeds, and having the user input overridden by the system 100.

The present invention allows a user 22 to navigate through the array 10 at the different speeds. Depending on the speed (i.e. number of camera nodes transversed per unit of time) indicated by the user's input, such as movement of a pointing device (or other interface device), the server 18 will apply an algorithm that controls the transition between camera outputs either at critical speed (n nodes/per unit of time), under critical speed (n−1 nodes/per unit of time), or over critical speed (n+1 nodes/per unit of time).

It is to be understood that speed of movement through the array 10 can alternatively be expressed as the time to switch from one camera 14 to another camera 14.

Specifically, as shown in step 140*a*, the server 18 makes the determination whether the user input corresponds to moving to the right at a critical speed. The critical speed is preferably a predetermined speed of movement through the array 10 set by the system operator or designer depending on the anticipated environment being viewed. Further, the critical speed depends upon various other factors, such as focal length, distance between cameras, distance between the cameras and the viewed object, and the like. The speed of movement through the array 10 is controlled by the number of cameras 14 traversed in a given time period. Thus, the movement through the array 10 at critical speed corresponds to traversing some number, "n", camera nodes per millisecond, or taking some amount of time, "s", to switch from one camera 14 to another. It is to be understood that in the same embodiment the critical speed of moving through the array 10 in one dimension need not equal the critical speed of moving through the array in another dimension. Consequently, the server 18 increments the current node address along the X axis at n nodes per millisecond.

In the present preferred embodiment the user traverses twenty-four cameras 14 per second. As discussed above, a movie projector records twenty-four frames per second. Analogizing between the movie projector and the present invention, at critical the user traverses (and the server 18 switches between) approximately twenty-four cameras 14 per second, or a camera 14 approximately every 0.04167 seconds.

As shown in FIG. 6, the user 22 may advance not only at critical speed, but also at over the critical speed, as shown in step 140*b*, or at under the critical speed, as shown in step 140*c*. Where the user input "I" indicates movement through the array 10 at over the critical speed, the server 18 increments the current node address along the X axis by a unit of greater than n, for example, at n+2 nodes per millisecond. The step of incrementing the current node address at n+1 nodes per millisecond along the X axis is shown in step 150*b*. Where the user input "I" indicates movement through the array 10 at under the critical speed, the server 18 proceeds to increment the current node address at a variable less than n, for example, at n−1 nodes per millisecond. This operation is shown as step 150c.

Scaleable Arrays

The shape of the array 10 can also be electronically scaled and the system 100 designed with a "center of gravity" that will ease a user's image path back to a "starting" or "critical position" node or ring of nodes, either when the user 22 releases control or when the system 100 is programmed to override the user's autonomy; that is to say, the active perimeter or geometry of the array 10 can be pre-configured to change at specified times or intervals in order to corral or focus attention in a situation that requires dramatic shaping. The system operator can, by real-time manipulation or via a pre-configured electronic proxy sequentially activate or deactivate designated portions of the camera array 10. This is of particular importance in maintaining authorship and dramatic pacing in theatrical or entertainment venues, and also for implementing controls over how much freedom a user 22 will have to navigate through the array 10.

In the present embodiment, the system 100 can be programmed such that certain portions of the array 10 are unavailable to the user 22 at specified times or intervals. Thus, continuing with step 140d of FIG. 6, the server 18 makes the determination whether the user input corresponds to movement to the right through the array but is subject to a navigation control algorithm. The navigation control algorithm causes the server 18 to determine, based upon navigation control factors, whether the user's desired movement is permissible.

More specifically, the navigation control algorithm, which is programmed in the server 18, determines whether the desired movement would cause the current node address to fall outside the permissible range of node coordinates. In the present embodiment, the permissible range of node coordinates is predetermined and depends upon the time of day, as noted by the server 18. Thus, in the present embodiment, the navigation control factors include time. As will be appreciated by those skilled in the art, permissible camera nodes and control factors can be correlated in a table stored in memory.

In an alternate embodiment, the navigation control factors include time as measured from the beginning of a performance being viewed, also as noted by the server. In such an embodiment, the system operator can dictate from where in the array a user will view certain scenes. In another alternate embodiment, the navigation control factor is speed of movement through the array. For example, the faster a user 22 moves or navigates through the array, the wider the turns must be. In other alternate embodiments, the permissible range of node coordinates is not predetermined. In one embodiment, the navigation control factors and, therefore, the permissible range, is dynamically controlled by the system operator who communicates with the server via an input device.

Having determined that the user input is subject to the navigation control algorithm, the server 18 further proceeds, in step 150d, to increment the current node address along a predetermined path. By incrementing the current node address along a predetermined path, the system operator is able to corral or focus the attention of the user 22 to the particular view of the permissible cameras 14, thereby maintaining authorship and dramatic pacing in theatrical and entertainment venues.

In an alternate embodiment where the user input is subject to a navigation control algorithm, the server 18 does not move the user along a predetermined path. Instead, the server 18 merely awaits a permissible user input and holds the view at the current node. Only when the server 18 receives a user input resulting in a permissible node coordinate will the server 18 adjust the user's view.

Additional Source Output/Throughput

In addition to moving through the array 10, the user 22 may, at predetermined locations in the array 10, choose to leave the real world environment being viewed. More specifically, additional source outputs, such as computer graphic imagery, virtual world camera views and virtual world grid data, virtual world imagery, virtual objects and their grid positioning data, applets, sprites, avatar representations, film clips, animation, augmented reality objects or images or recordings of real-world objects and other artificial and real camera outputs, are made available to the user 22. In one embodiment, the additional source output is composited with the view of the real environment. In an alternate embodiment, the user's view transfers completely from the real environment to that offered by the additional source output.

More specifically, the additional source output is stored (preferably in digital form) in the electronic storage device 20. Upon the user 22 inputting a desire to view the additional source output, the server 18 transmits the additional source output to the user interface/display device 24. The present embodiment, the server 18 simply transmits the additional source output to the user display device 24. In an alternate embodiment, the server 18 first composites the additional source output with the camera output and then transmits the composited signal to the user interface/display device 24.

As shown in step 140e, the server 18 makes the determination whether the user input corresponds to moving in the array into the source output. If the user 22 decides to move (or the system is configured to cause the user 22 to move) into the additional source output, the server 18 adjusts the view by, for example, substituting the additional source output for the updated camera output identified in either of steps 150a-d.

The additional source output may include multiplexed, composited (using blue screen, green screen, or alpha techniques), or layered output from the group of various inputs and/or outputs including: computer graphic imagery, virtual world camera views and virtual world grid data, virtual world imagery, virtual objects and their grid positioning data, applets, sprites, avatar representations, film clips, animation, augmented reality objects or images or recordings of real-world objects. The system may present the additional source output, alone or in combination with the camera output, for example, by mosaicing, mixing, layering or multiplexing it.

The additional source output may be aligned and registered with real world camera views along the user's perspective motion path, as the user's viewpoint moves from camera to camera. This alignment or registration of a real world camera view with a virtual world view can be aided by camera orientation and pointing platforms (such as a spherical ultrasonic motor or a spherical magnetic stepper motor or other such devices on the physical camera array side, and virtual camera navigation algorithms on the virtual world side) along with protocol handshakes between the camera array operating system and the virtual world operating system; and the alignment can be triggered or guided by transceivers embedded in real world environmental sensors, such as: radio frequency (RFID) tags worn by event actors or embedded in event objects, proximity sensors, infrared heat sensors, motion sensors, sound and voice sensors, vibration sensors, and further aided by accelerometers and/or transceivers riding on the cameras themselves or the camera support structure. The alignment can also be aided by windowing and image repositioning within the camera's field of view.

The system may also be configured to permit the convergence of real world perspective paths with virtual world perspective paths and the seamless continuation of such paths. For example, where the additional source output is imagery and data from a virtual world environment relevant to a user-guided virtual camera path, such as camera animation algorithms and data from wire mesh geometries, and where the real-world perspective motion path (the path that progresses through the overlapping fields of view of the physical camera array) transitions to a virtual world camera path, the user's path along the real world camera array will transition fluidly and seamlessly into a continuing path in the virtual world, and subsequently along virtual world camera paths that are controlled by the user. The motion path transition between worlds can be effected by a number of methods, including camera sequencing that employs the same techniques used to move the viewing path through the physical array (and where the first virtual camera view is treated as if it were the next physical camera view in the physical array). It can also employ other techniques, including multiplexing, layering, or transitional visual effects, e.g., a simple dissolve. The transition from the viewing path along the physical array of cameras into a navigable virtual world camera path is novel and requires software APIs (application interfaces) on both sides of the equation for the viewing path to be tightly convergent and continuous. The system of one embodiment identifies some real world feature that could be made common to both worlds, a doorway, for example, or some architectural element. Since the virtual world is completely malleable, a replica of the real world feature common to both worlds could be constructed using building tools in the virtual environment and based, in one embodiment, on a 3D laser map (or the data from some other metrology tool familiar to those in the art) of the real-world topology; this virtual world object or feature would be subsequently scaled, rotated, and aligned with the feature in the physical array camera views to provide the visual transition ramp. The method of transition could be as simple as a dissolve (or any method that would equate with the camera array navigation process) and would be supported by a protocol handshake between the camera array operating system and the virtual world operating system (for example, an open-source simulation environment). Windowing, digital zooming and repositioning within the physical camera sensors would provide another layer of adjustment and refinements for finessing the transitions.

In certain embodiments, the system links real and virtual world paths in a continuum that can scale to a "3D Internet". In such embodiments, the additional source output may be the imagery and data from a virtual world camera path, and herein the egress from that virtual world camera path is a transition to a real-world navigable camera array (or some other interim virtual world path, or any alternative, physical camera array path); thus, a continuum is established for making the Internet a continuously navigable spatial network of paths, based on transitions between the user-guided perspective motion paths along navigable real world camera arrays and the user-guided camera paths in virtual worlds. In essence, virtual worlds thus become the connecting tissue between separated real world environments (e.g., transitioning from a first real world camera array and associated environment to a second real world camera array and associated environment) and vice versa, and real world environments can be "nested" in the "shells" of virtual worlds and vice versa.

The system programming, including the above-referenced APIs, specifies and controls the objects and elements in a given environment and allows the code to function in specific ways. For example, the functional interface in a virtual world environment that allows the user to bring a real world video stream (link) into a virtual world space and map it onto objects or the background plane may be such an API. Such functionalities already exist in virtual worlds including that under the tradename of SECOND LIFE. They enable real video to be displayed (e.g., mapped) on a virtual object that can be resized in real time and/or mapped on the virtual world's background plane (e.g., so that the virtual world, from the user's camera perspective (and thus corresponding camera output) is enveloped by the virtual world. Wherever the user navigates or whatever direction the user turns or looks, the camera perspective is the background plane. The reverse mapping is also within the scope of the present invention, namely mapping virtual worlds (or other additional source output) into the real world camera perspective (output), for example, onto real objects or substituting a real background plane with a virtual one.

In such embodiments, the mapping of an image, or sequence of images, in various ways on the virtual world plane or on objects in it involves aligning the digital video imagery from the real world camera path with the digital imagery from the virtual world camera path, or overlaying one on top of another, to create the illusion that a real world path was merging into a virtual camera path and vice versa. Consequently, the user experiences a continuous motion path, bridging from a real world environment into a virtual world environment (or vice versa) or into a combination real and virtual world environment; that experience is mediated by the system software that analyzes and controls the real and virtual camera paths on both sides of the transition, making adjustments to align and lock or synchronize those paths, and create entry and exit "ramps" that would hide any "stalls" caused by handshakes and protocols negotiated between the different domains.

Different techniques may be used to align or overlay the real and virtual worlds, including those utilized in movie film special effects, depending on what creative tools the system designer decides best promotes the effect, including the scaling and aligning of objects or features that are common to both worlds. The latter approach means that real world objects are reproduced in the virtual world and scaled and aligned with the object or feature as it appears in the last frame of the real world video so that those objects or features are "extended" into the virtual environment. An example would be a hallway or a tunnel or a path with, perhaps, various replicated inanimate objects repeating from the real world environment and continuing into the virtual one to suggest the extension of the space. Such computer graphics imagery (CGI) special effects may thus build on the last frame of actual film footage when transitioning to digital effects.

Although tools and processes for CGI effects are known, as will be appreciated to those skilled in the art, such embodiments of the present invention have the benefit of a guided motion path, initiated by the user, but intermediated by system software, that will bridge between real and virtual worlds by bringing together the user-guided camera paths on both sides of the transition.

Thus, the system provides the ability to align and lock a navigable video user path (that is, a sequence of digital video frames controlled by the user) with a separate individual camera path in a virtual world (a frame sequence in the virtual world environment also controlled by the user). Such "aligning and locking" may entail establishing specific correlations between the apparent motion of a specific real world navigation path and the apparent motion of a specific virtual camera path that moves across the grid of a virtual world.

Notably, in certain embodiments, the overlaid camera perspectives (e.g., real camera output and virtual camera output), which can be thought of as on and off ramps between the real and virtual environments, may be held in buffer or other system memory for efficient retrieval, thereby circumventing the latency that may be encountered by having to "log" or go through handshake protocols between one environment (server) and another. The end result would be a continuous navigation experience with no stalls or stops due to negotiating access from one domain into another.

It is important to note that if the end user is given options for moving through a navigable video camera array (i.e., speed and path direction in approaching a "transition point") that only one side of the equation will be known prior to the transition—the characteristics of the user's camera path before the transition—specifically, how fast the user is moving through the array, and from what direction the user is approaching the transition point. Thus, in certain embodiments, the characteristics of the camera path (for example, in the virtual world on the other side of the real-to-virtual world transition) are extrapolated to match those path characteristics. Such characteristics may include direction, speed, orientation and other characteristics of the user's navigation. For example, if the background is moving left to right, or right to left, that orientation and flow ideally is matched and continued (at least momentarily through the transition) in the virtual world camera movement.

The motion along the user path can be characterized, in one embodiment, by the concept of "apparent speed" and/or "apparent direction" (e.g., relative to the background). Thus, the orientation of the camera field of view relative to the direction of the motion path through the local environment, and the distance of objects from the camera (for example, whether the camera is perpendicular or parallel to the line of movement, or whether there are near-field objects or far-field objects in view) have a bearing on the perception of speed.

Of course, in simpler embodiments, the user is not given options for such characteristics, so by default the real and virtual world navigation characteristics may be matched.

If transitioning from a virtual world environment to a real world environment, the adjustments to the user's path through the real camera array might be controlled by a system "override" (i.e., overriding the user inputs), which temporarily commandeers the user's control and automatically feathers the speed and direction of the user's path and flow through the real-virtual/virtual-real camera transition (and after the transition period, cedes control back to the user). If transitioning from a real world camera array to a user's individual virtual world camera, adjustments to the user's path in the virtual world may be imposed through the transition by an algorithm that temporarily controls the camera path and which, subsequent to ushering the user through the transition, cedes control back to the user to either stop or move the camera ahead in any direction desired. Control methods include adjusting the path speed or direction through the camera nodes, varying the frame rate, "double printing" (to use an old film term) or duplicating and repeating camera fields, deleting in-between frames, or setting virtual world camera animation functions to expand or compress the time line.

This correlation between paths in both worlds could also be driven by a "grid" correspondence, whereby the software enables a visual grid to be superimposed on the topology of the real world camera arrays and referenced to various grid schemes in virtual worlds. In this embodiment, the frequency of grid lines navigated (representing distances across camera fields of view) and also the movement of in situ objects in the local environment moving across the grid (representing near-field or far field objects and the direction of movement) provide the data for shaping the virtual world camera path through the transition and perhaps just beyond it. In the reverse scenario (and since the virtual world camera paths offer more flexibility than the real world array paths), the virtual world ramp into the transition will be shaped according to the path flexibility on the real world array side (that is, whether there is more than one array path diverging from the transition exit).

Finally, since (in some embodiments) there may be a latency factor in moving the user experience from one server to another (in logging a user from a navigable video server in the "cloud" to another virtual world server), APIs in the real word Navigable Video System and APIs in software add-ons for virtual world "users" (the GUIs that control the user experience and give users options for how to view and move through the virtual grid) would facilitate the automatic pre-build of camera-path "ramps" for each respective side of the transition. These ramps (based on the path options and specific characteristics of each local world) would enable the expansion or compression of the time it takes to transverse camera nodes leading up to the transition points. They would be applied relative to the closure of the handshake between servers, so that the transition could be a fluid and continuous motion path and not be interrupted by administrative protocols or Internet congestion. Thus, when a request is made to navigate between worlds via marked transition points, a pre-built motion ramp is activated and the software intermediates to control the flow of the transition as it monitors the progress of any log-in or handshake process behind the scenes.

It should be noted that embodiments of the present invention are not limited to any particular type of transition or system implementation for a transition, if a transition is even provided.

Continuing with the process flow, once the current node address is updated in either of steps 150a-d, the server 18 proceeds to adjust the user's view in step 250. When adjusting the view, the server 18 "mixes" the existing or current camera output being displayed with the output of the camera 14 identified by the updated camera node address. Mixing the outputs is achieved differently in alternate embodiments of the invention. In the present embodiment, mixing the outputs involves electronically switching at a particular speed from the existing camera output to the output of the camera 14 having the new current node address (to the additional source output).

It is to be understood that in this and other preferred embodiments disclosed herein, the camera outputs are synchronized. As is well known in the art, a synchronizing signal from a "sync generator" is supplied to the cameras. The sync generator may take the form of those used in video editing and may comprise, in alternate embodiments, part of the server, the hub, and/or a separate component coupled to the array.

As described above, in the current embodiment, at critical speed, the server 18 switches camera outputs approximately at a rate of 24 per second, or one every 0.04167 seconds. If the user 22 is moving through the array 10 at under the critical speed, the outputs of the intermediate cameras 14 are each displayed for a relatively longer duration than if the user is moving at the critical speed. Similarly, each output is displayed for a relatively shorter duration when a user navigates at over the critical speed. In other words, the server 18 adjusts the switching speed based on the speed of the movement through the array 10.

Of course, it is to be understood that in a simplified embodiment of the present invention, the user may navigate at only the critical speed.

In another alternate embodiment, mixing the outputs is achieved by compositing the existing or current output and the updated camera node output. In yet another embodiment, mixing involves dissolving the existing view into the new view. In still another alternate embodiment, mixing the outputs includes adjusting the frame refresh rate of the user display device. Additionally, based on speed of movement through the array, the server may add motion blur to convey the realistic sense of speed.

In yet another alternate embodiment, the server causes a black screen to be viewed instantaneously between camera views. Although not always advantageous, such black screens reduce the physiologic "carrying over" of one view into a subsequent view.

It is to be understood that the user inputs corresponding to movements through the array at different speeds may include either different keystrokes on a keypad, different positions of a joystick, positioning a joystick in a given position for a predetermined length of time, and the like. Similarly, the decision to move into an additional source output may be indicated by a particular keystroke, joystick movement, or the like (including optical, infrared, gesture driven, voice-activated, biofeedback-initiated, multi-touch or haptic interface controllers).

In another embodiment, mixing may be accomplished by "mosaicing" the outputs of the intermediate cameras 14. U.S. Pat. No. 5,649,032 entitled System For Automatically Aligning Images To Form A Mosaic Image to Peter J. Burt et al. discloses a system and method for generating a mosaic from a plurality of images and is hereby incorporated by reference. The server 18 automatically aligns one camera output to another camera output, a camera output to another mosaic (generated from previously occurring camera output) such that the output can be added to the mosaic, or an existing mosaic to a camera output.

Once the mosaic alignment is complete, the present embodiment utilizes a mosaic composition process to construct (or update) a mosaic. The mosaic composition comprises a selection process and a combination process. The selection process automatically selects outputs for incorporation into the mosaic and may include masking and cropping functions to select the region of interest in a mosaic. Once the selection process selects which output(s) are to be included in the mosaic, the combination process combines the various outputs to form the mosaic. The combination process applies various output processing techniques, such as merging, fusing, filtering, output enhancement, and the like, to achieve a seamless combination of the outputs. The resulting mosaic is a smooth view that combines the constituent outputs such that temporal and spatial information redundancy are minimized in the mosaic. In one embodiment of the present invention, the mosaic may be formed as the user moves through the system (on the fly) and the output image displayed close to real time. In another embodiment, the system may form the mosaic from a predetermined number of outputs or during a predetermined time interval, and then display the images pursuant to the user's navigation through the environment.

In yet another embodiment, the server 18 enables the output to be mixed by a "tweening" process. One example of the tweening process is disclosed in U.S. Pat. No. 5,529,040 entitled Method For Determining Sensor Motion And Scene Structure And Image Processing System Therefor to Keith J. Hanna, herein incorporated by reference. Tweening enables the server 18 to process the structure of a view from two or more camera outputs of the view.

Applying the Hanna patent to the telepresence method/system herein, tweening is now described. The server monitors the movement among the intermediate cameras 14 through a scene using local scene characteristics such as brightness derivatives of a pair of camera outputs. A global camera output movement constraint is combined with a local scene characteristic constancy constraint to relate local surface structures with the global camera output movement model and local scene characteristics. The method for determining a model for global camera output movement through a scene and scene structure model of the scene from two or more outputs of the scene at a given image resolution comprises the following steps:

(a) setting initial estimates of local scene models and a global camera output movement model;

(b) determining a new value of one of the models by minimizing the difference between the measured error in the outputs and the error predicted by the model;

(c) resetting the initial estimates of the local scene models and the image sensor motion model using the new value of one of the models determined in step (b);

(d) determining a new value of the second of the models using the estimates of the models determined in step (b) by minimizing the difference between the measured error in the outputs and the error predicted by the model;

(e) warping one of the outputs towards the other output using the current estimates of the models at the given image resolution; and (f) repeating steps (b), (c), (d) and (e) until the differences between the new values of the models and the values determined in the previous iteration are less than a certain value or until a fixed number of iterations have occurred.

It should be noted that where the Hanna patent effectuates the tweening process by detecting the motion of an image sensor (e.g., a video camera), an embodiment of the present invention monitors the user movement among live cameras or storage nodes.

Figure 7A:
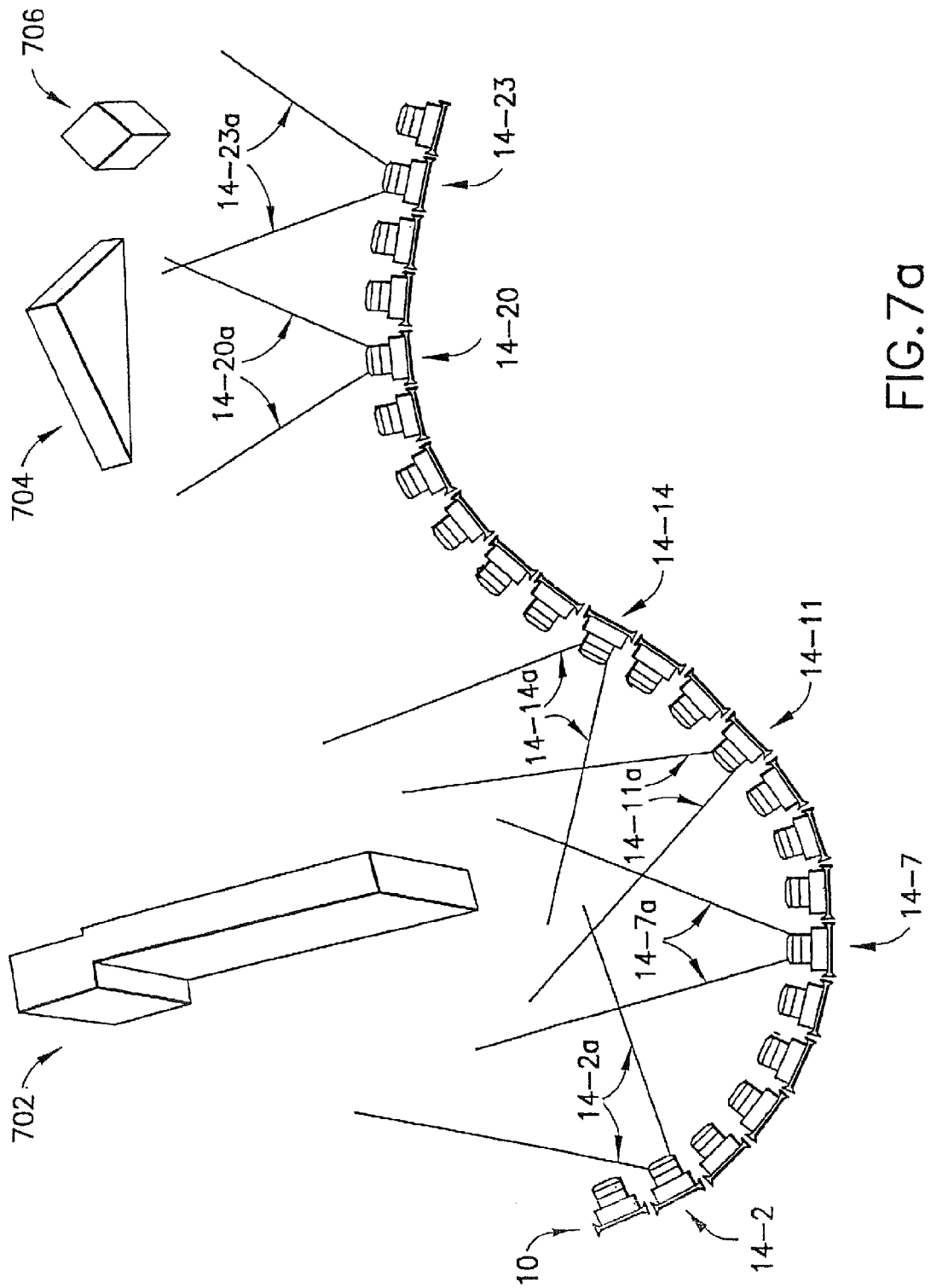
FIG. 7a is a perspective view of a portion of one embodiment of the present invention illustrating the arrangement of the camera array relative to objects being viewed.

In an alternate embodiment, although not always necessary, to ensure a seamless progression of views, the server 18 also transmits to the user display device 24 outputs from some or all of the intermediate cameras, namely those located between the current camera node and the updated camera node. Such an embodiment will now be described with reference to FIGS. 7a-7g. Specifically, FIG. 7a illustrates a curvilinear portion of an array 10 that extends along the X axis or to the left and right from the user's perspective. Thus, the coordinates that the server 18 associates with the cameras 14 differ only in the X coordinate. More specifically, for purposes of the present example, the cameras 14 can be considered sequentially numbered, starting with the left-most camera 14 being the first, i.e., number "1". The X coordinate of each camera 14 is equal to the camera's position in the array. For illustrative purposes, particular cameras will be designate 14-X, where X equals the camera's position in the array 10 and, thus, its associated X coordinate.

In general, FIGS. 7a-7g illustrate possible user movement through the array 10. The environment to be viewed includes three objects 602, 604, 606, the first and second of which include numbered surfaces. As will be apparent, these numbered surface allow a better appreciation of the change in user perspective.

In FIG. 7a, six cameras 14-2, 14-7, 14-11, 14-14, 14-20, 14-23 of the array 10 are specifically identified. The boundaries of each camera's view is identified by the pair of lines 14-2a, 14-7a, 14-11a, 14-14a, 14-20a, 14-23a, radiating from each identified camera 14-2, 14-7, 14-11, 14-14, 14-20, 14-23, respectively. As described below, in the present example the user 22 navigates through the array 10 along the X axis such that the images or views of the environment are those corresponding to the identified cameras 14-2, 14-7, 14-11, 14-14, 14-20, 14-23.

Figure 7D:
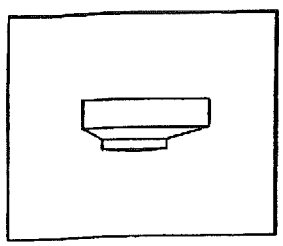
Figure 7G:
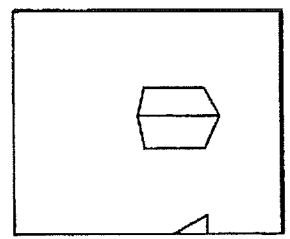
Figure 7C:
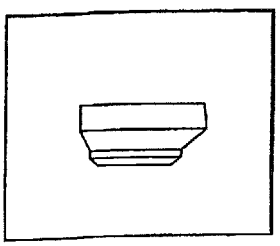
Figure 7F:
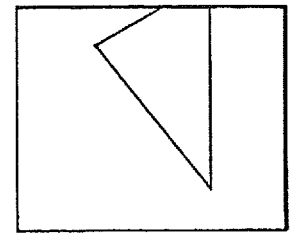
Figure 7B:
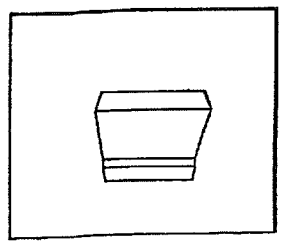

The present example provides the user 22 with the starting view from camera 14-2. This view is illustrated in FIG. 7b. The user 22, desiring to have a better view of the object 702, pushes the "7" key on the keyboard. This user input is transmitted to and interpreted by the server 18.

Because the server 18 has been programmed to recognized the "7" key as corresponding to moving or jumping through the array to camera 14-7. The server 18 changes the X coordinate of the current camera node address to 7, selects the output of camera 14-7, and adjusts the view or image sent to the user 22. Adjusting the view, as discussed above, involves mixing the outputs of the current and updated camera nodes. Mixing the outputs, in turn, involves switching intermediate camera outputs into the view to achieve the seamless progression of the discrete views of cameras 14-2 through 14-7, which gives the user 22 the look and feel of moving around the viewed object. The user 22 now has another view of the first object 702. The view from camera 14-7 is shown in FIG. 7c. As noted above, if the jump in camera nodes is greater than a predetermined limit, the server 18 would omit some or all of the intermediate outputs.

Pressing the "right arrow" key on the keyboard, the user 22 indicates to the system 100 a desire to navigate to the right at critical speed. The server 18 receives and interprets this user input as indicating such and increments the current camera node address by n=4. Consequently, the updated camera node address is 14-11. The server 18 causes the mixing of the output of camera 14-11 with that of camera 14-7. Again, this includes switching into the view the outputs of the intermediate cameras (i.e., 14-8, 14-9, and 14-10) to give the user 22 the look and feel of navigating around the viewed object. The user 22 is thus presented with the view from camera 14-11, as shown in FIG. 7d.

Figure 7E:
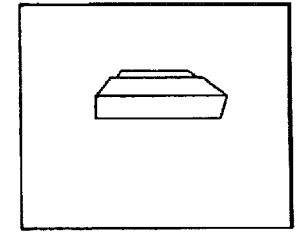

Still interested in the first object 702, the user 22 enters a user input, for example, "alt-right arrow," indicating a desire to move to the right at less than critical speed. Accordingly, the server 18 increments the updated camera node address by n−1 nodes, namely 3 in the present example, to camera 14-14. The outputs from cameras 14-11 and 14-14 are mixed, and the user 22 is presented with a seamless view associated with cameras 14-11 through 14-14. FIG. 7e illustrates the resulting view of camera 14-14.

With little to see immediately after the first object 702, the user 22 enters a user input such as "shift-right arrow," indicating a desire to move quickly through the array 10, i.e., at over the critical speed. The server 18 interprets the user input and increments the current node address by n+2, or 6 in the present example. The updated node address thus corresponds to camera 14-20. The server 18 mixes the outputs of cameras 14-14 and 14-20, which includes switching into the view the outputs of the intermediate cameras 14-15 through 14-19. The resulting view of camera 14-20 is displayed to the user 22. As shown in FIG. 7f, the user 22 now views the second object 704.

Becoming interested in the third object 704, the user 22 desires to move slowly through the array 10. Accordingly, the user 22 enters "alt-right arrow" to indicate moving to the right at below critical speed. Once the server 18 interprets the received user input, it updates the current camera node address along the X axis by 3 to camera 14-23. The server 18 then mixes the outputs of camera 14-20 and 14-23, thereby providing the user 22 with a seamless progression of views through camera 14-23. The resulting view 14-23a is illustrated in FIG. 7g.

Other Data Devices

It is to be understood that devices other than cameras may be interspersed in the array. These other devices, such as RFID, motion capture cameras, reflective devices, make-up and systems, motion sensors and microphones, provide data to the server(s) for processing. For example, in alternate embodiments output from motion sensors or microphones are fed to the server(s) and used to scale the array. More specifically, permissible camera nodes (as defined in a table stored in memory) are those near the sensor or microphone having a desired output e.g., where there is motion or sound. As such, navigation control factors include output from other such devices. Alternatively, the output from the sensors or microphones are provided to the user. Furthermore, data received from any of such other data devices may be used as a trigger to transition to or otherwise provide additional source output to users or may be used in conjunction with the additional source output (e.g., using real world sounds captured from microphones in conjunction with a virtual world depiction).

Figure 8:
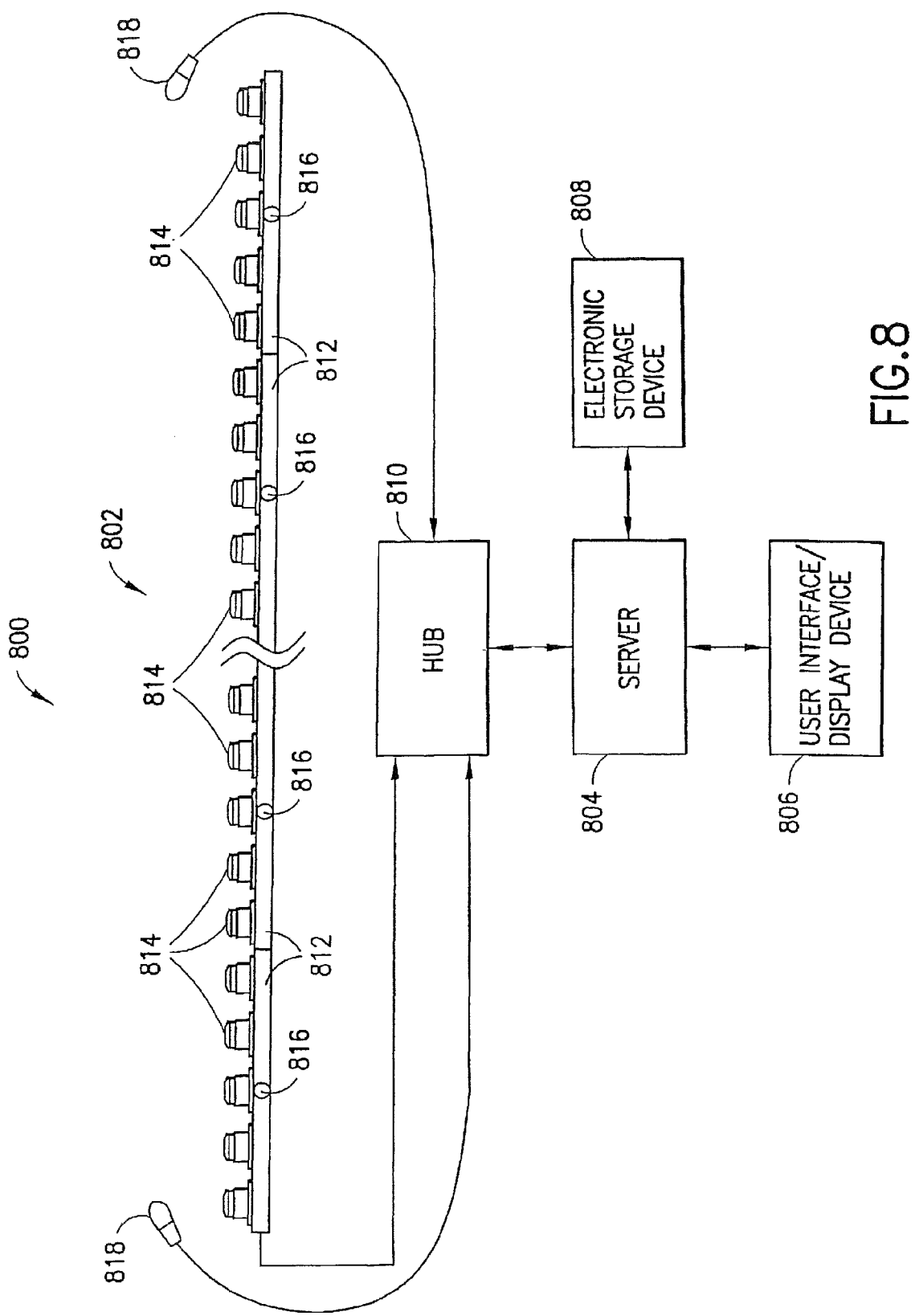
FIG. 8 is a schematic view of an alternate embodiment of the present invention.

An alternate embodiment in which the array of cameras includes multiple microphones interspersed among the viewed environment and the cameras will now be described with reference to FIG. 8. The system 800 generally includes an array of cameras 802 coupled to a server 804, which, in turn, is coupled to one or more user interface and display devices 806 and an electronic storage device 808. A hub 810 collects and transfers the outputs from the array 802 to the server 804. More specifically, the array 802 comprises modular rails 812 that are interconnected. Each rail 812 carries multiple microcameras 814 and a microphone 816 centrally located at rail 812. Additionally, the system 800 includes microphones 818 that are physically separate from the array 802. The outputs of both the cameras 814 and microphones 816, 818 are coupled to the server 804 for processing.

In general, operation of the system 800 proceeds as described with respect to system 100 of FIGS. 1-2d and 5-6. Beyond the operation of the previously described system 100, however, the server 804 receives the sound output from the microphones 816, 818 and, as with the camera output, selectively transmits sound output to the user. As the server 804 updates the current camera node address and changes the user's view, it also changes the sound output transmitted to the user. In the present embodiment, the server 804 has stored in memory an associated range of camera nodes with a given microphone, namely the cameras 814 on each rail 810 are associated with the microphone 816 on that particular rail 810. In the event a user attempts to navigate beyond the end of the array 802, the server 804 determines the camera navigation is impermissible and instead updates the microphone node output to that of the microphone 818 adjacent to the array 802.

In an alternate embodiment, the server 804 might include a database in which camera nodes in a particular area are associated with a given microphones. For example, a rectangle defined by the (X,Y, Z) coordinates (0,0,0), (10,0,0), (10,5,0), (0,5,0), (0,0,5), (10,0,5), (10,5,5) and (0,5,5) are associated with a given microphone. It is to be understood that selecting one of the series of microphones based on the user's position (or view) in the array provides the user with a sound perspective of the environment that coincides with the visual perspective.

Figure 9:
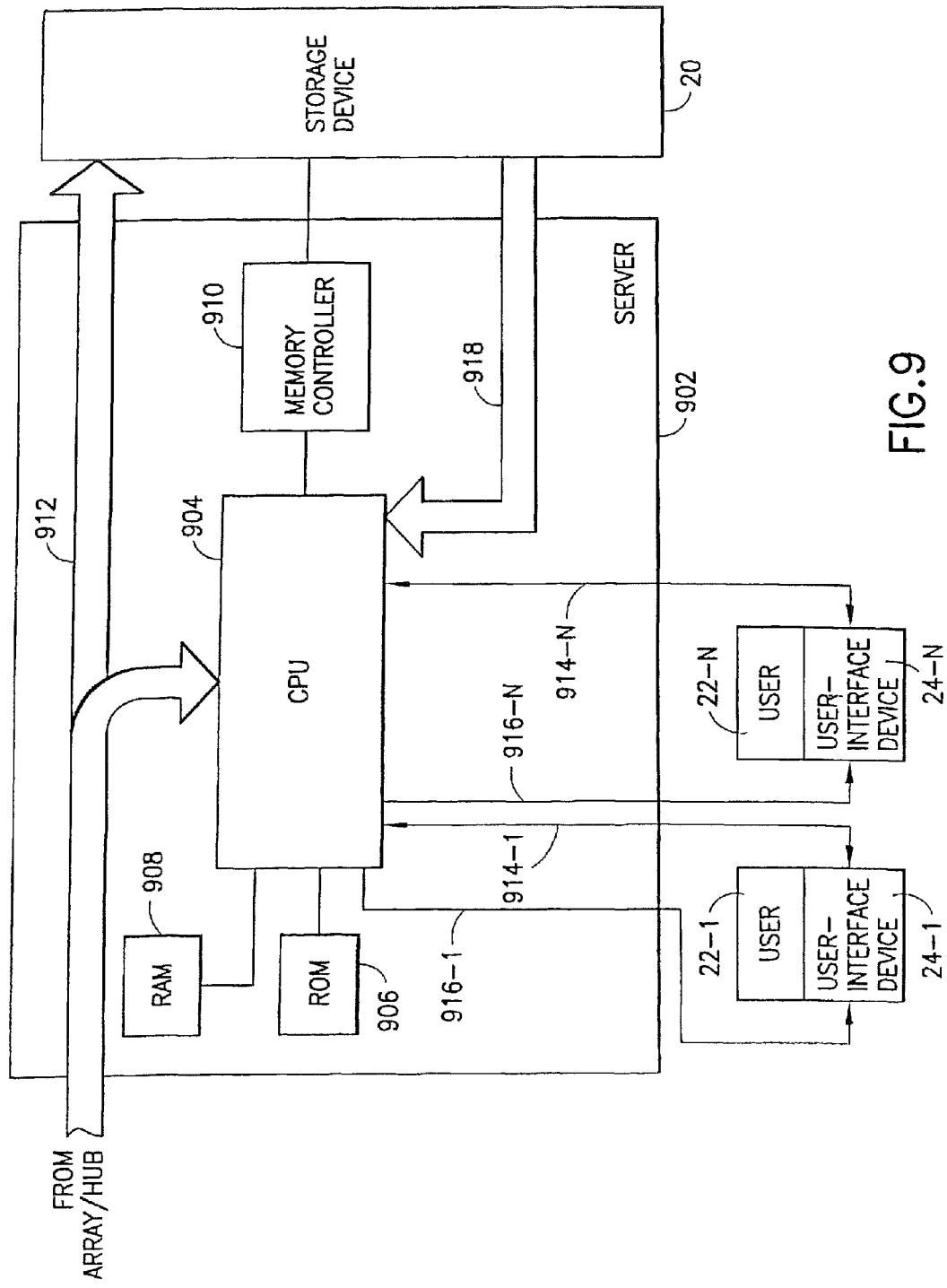
FIG. 9 is a schematic view of a server according to one embodiment of the present invention.

It is to be understood that the server of the embodiments discussed above may take any of a number of known configurations. Two examples of server configurations suitable for use with the present invention will be described with reference to FIGS. 9 and 10. Turning first to FIG. 9, the server 902, electronic storage device 20, array 10, users (1, 2, 3, ... N) 22-1-22-N, and associated user interface/display devices 24-1-24-N are shown therein.

The server 902 includes, among other components, a processing means in the form of one or more central processing units (CPU) 904 coupled to associated read only memory (ROM) 906 and a random access memory (RAM) 908. In general, ROM 906 is for storing the program that dictates the operation of the server 902, and the RAM 908 is for storing variables and values used by the CPU 904 during operation. Also coupled to the CPU 904 are the user interface/display devices 24. It is to be understood that the CPU may, in alternate embodiments, comprise several processing units, each performing a discrete function.

Coupled to both the CPU 904 and the electronic storage device 20 is a memory controller 910. The memory controller 910, under direction of the CPU 904, controls accesses (reads and writes) to the storage device 20. Although the memory controller 910 is shown as part of the server 902, it is to be understood that it may reside in the storage device 20.

During operation, the CPU 904 receives camera outputs from the array 10 via bus 912. As described above, the CPU 904 mixes the camera outputs for display on the user interface/display device 24. Which outputs are mixed depends on the view selected by each user 22. Specifically, each user interface/display devices 24 transmits across bus 914 the user inputs that define the view to be displayed. Once the CPU 904 mixes the appropriate outputs, it transmits the resulting output to the user interface/display device 24 via bus 916. As shown, in the present embodiment, each user 22 is independently coupled to the server 902.

The bus 912 also carries the camera outputs to the storage device 20 for storage. When storing the camera outputs, the CPU 904 directs the memory controller 910 to store the output of each camera 14 in a particular location of memory in the storage device 20.

When the image to be displayed has previously been stored in the storage device 20, the CPU 904 causes the memory controller 910 to access the storage device 20 to retrieve the appropriate camera output. The output is thus transmitted to the CPU 904 via bus 918 where it is mixed. Bus 918 also carries additional source output to the CPU 904 for transmission to the users 22. As with outputs received directly from the array 10, the CPU 904 mixes these outputs and transmits the appropriate view to the user interface/display device 24.

Figure 10:
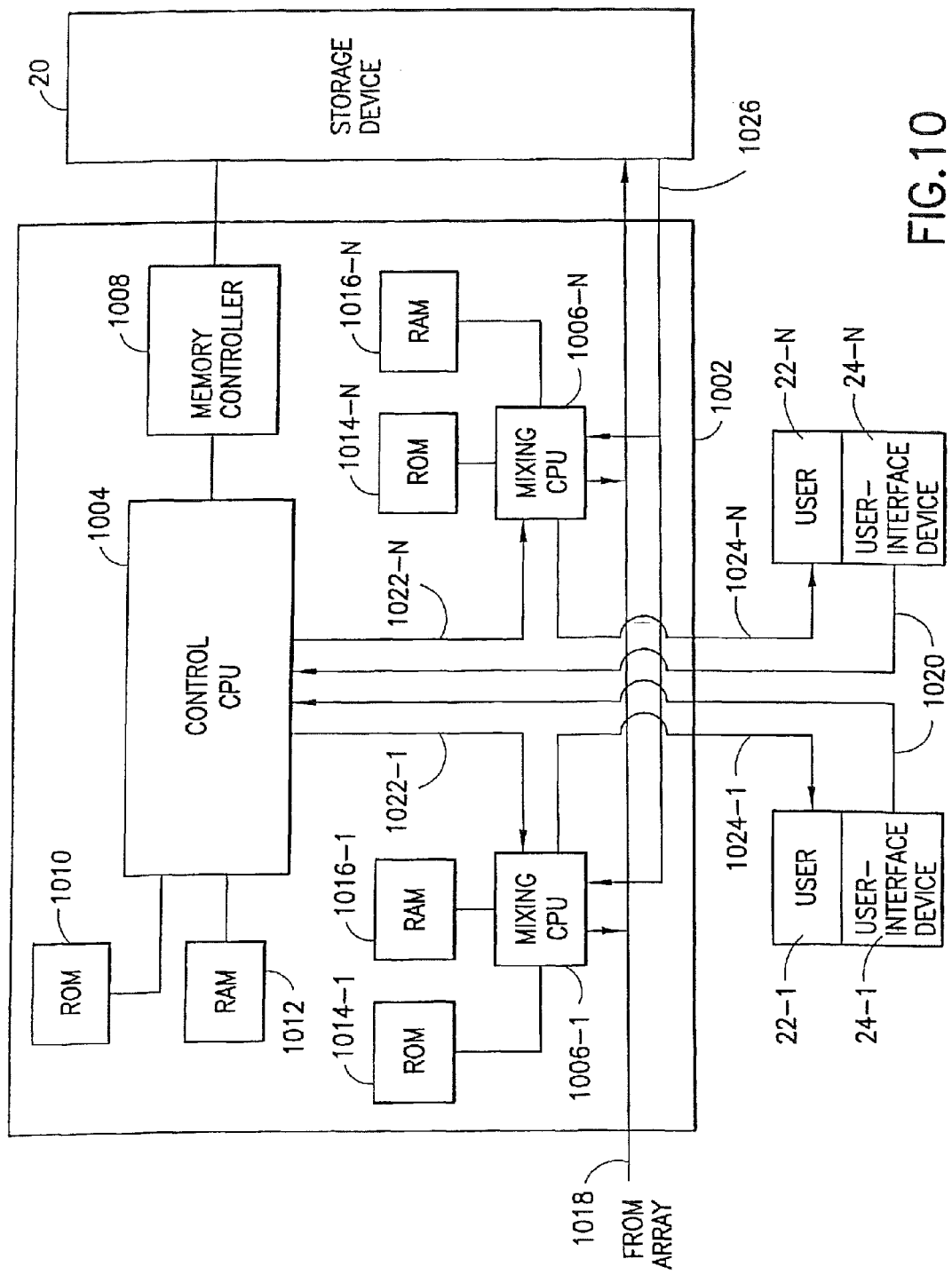
FIG. 10 is a schematic view of a server according to an alternate embodiment of the present invention.

FIG. 10 shows a server configuration according to an alternate embodiment of the present invention. As shown therein, the server 1002 generally comprises a control central processing unit (CPU) 1004, a mixing CPU 1006 associated with each user 22, and a memory controller 1008. The control CPU 1004 has associated ROM 1010 and RAM 1012. Similarly, each mixing CPU 1006 has associated ROM 1014 and RAM 1016.

To achieve the functionality described above, the camera outputs from the array 10 are coupled to each of the mixing CPUs 1 through N 1006-1, 1006-N via bus 1018. During operation, each user 22 enters inputs in the interface/display device 24 for transmission (via bus 1020) to the control CPU 1004. The control CPU 1004 interprets the inputs and, via buses 1022-1, 1022-N, transmits control signals to the mixing CPUs 1006-1, 1006-N instructing them which camera outputs received on bus 1018 to mix. As the name implies, the mixing CPUs 1006-1, 1006-N mix the outputs in order to generate the appropriate view and transmit the resulting view via buses 1024-1, 1024-N to the user interface/display devices 24-1, 24-N.

In an alternate related embodiment, each mixing CPU 1006 multiplexes outputs to more than one user 22. Indications of which outputs are to be mixed and transmitted to each user 22 comes from the control CPU 1004.

The bus 1018 couples the camera outputs not only to the mixing CPUs 1006-1, 1006-N, but also to the storage device 20. Under control of the memory controller 1008, which in turn is controlled by the control CPU 1004, the storage device 20 stores the camera outputs in known storage locations. Where user inputs to the control CPU 1004 indicate a users' 22 desire to view stored images, the control CPU 1004 causes the memory controller 1008 to retrieve the appropriate images from the storage device 20. Such images are retrieved into the mixing CPUs 1006 via bus 1026. Additional source output is also retrieved to the mixing CPUs 1006-1, 1006-N via bus 1026. The control CPU 1004 also passes control signals to the mixing CPUs 1006-1, 1006-N to indicate which outputs are to be mixed and displayed.

Stereoscopic Views

It is to be understood that it is within the scope of the present invention to employ stereoscopic views of the environment. To achieve the stereoscopic view, the system retrieves from the array (or the electronic storage device) and simultaneously transmits to the user at least portions of outputs from two cameras. The server processing element mixes these camera outputs to achieve a stereoscopic output. Each view provided to the user is based on such a stereoscopic output. In one stereoscopic embodiment, the outputs from two adjacent cameras in the array are used to produce one stereoscopic view. Using the notation of FIGS. 7a-7g, one view is the stereoscopic view from cameras 14-1 and 14-2. The next view is based on the stereoscopic output of cameras 14-2 and 14-3 or two other cameras. Thus, in such an embodiment, the user is provided the added feature of a stereoscopic seamless view of the environment.

Multiple Users

As described above, the present invention allows multiple users to simultaneously navigate through the array independently of each other. To accommodate multiple users, the systems described above distinguish between inputs from the multiple users and selects a separate camera output appropriate to each user's inputs. In one such embodiment, the server tracks the current camera node address associated with each user by storing each node address in a particular memory location associate with that user. Similarly, each user's input is differentiated and identified as being associated with the particular memory location with the use of message tags appended to the user inputs by the corresponding user interface device.

In an alternate embodiment, two or more users may choose to be linked, thereby moving in tandem and having the same view of the environment. In such an embodiment, each includes identifying another user by his/her code to serve as a "guide". In operation, the server provides the outputs and views selected by the guide user to both the guide and the other user selecting the guide. Another user input causes the server to unlink the users, thereby allowing each user to control his/her own movement through the array.

Multiple Arrays

In certain applications, a user may also wish to navigate forward and backward through the environment, thereby moving closer to or further away from an object. Although it is within the scope of the present invention to use cameras with zoom capability, simply zooming towards an object does not change the user's image point perspective. One such embodiment in which users can move dimensionally forward and backward through the environment with a changing image point perspective will now be described with respect to FIG. 11 and continuing reference to FIG. 1. As will be understood by those skilled in the art, the arrays described with reference to FIG. 11 may be used with any server, storage device and user terminals described herein.

Figure 11:
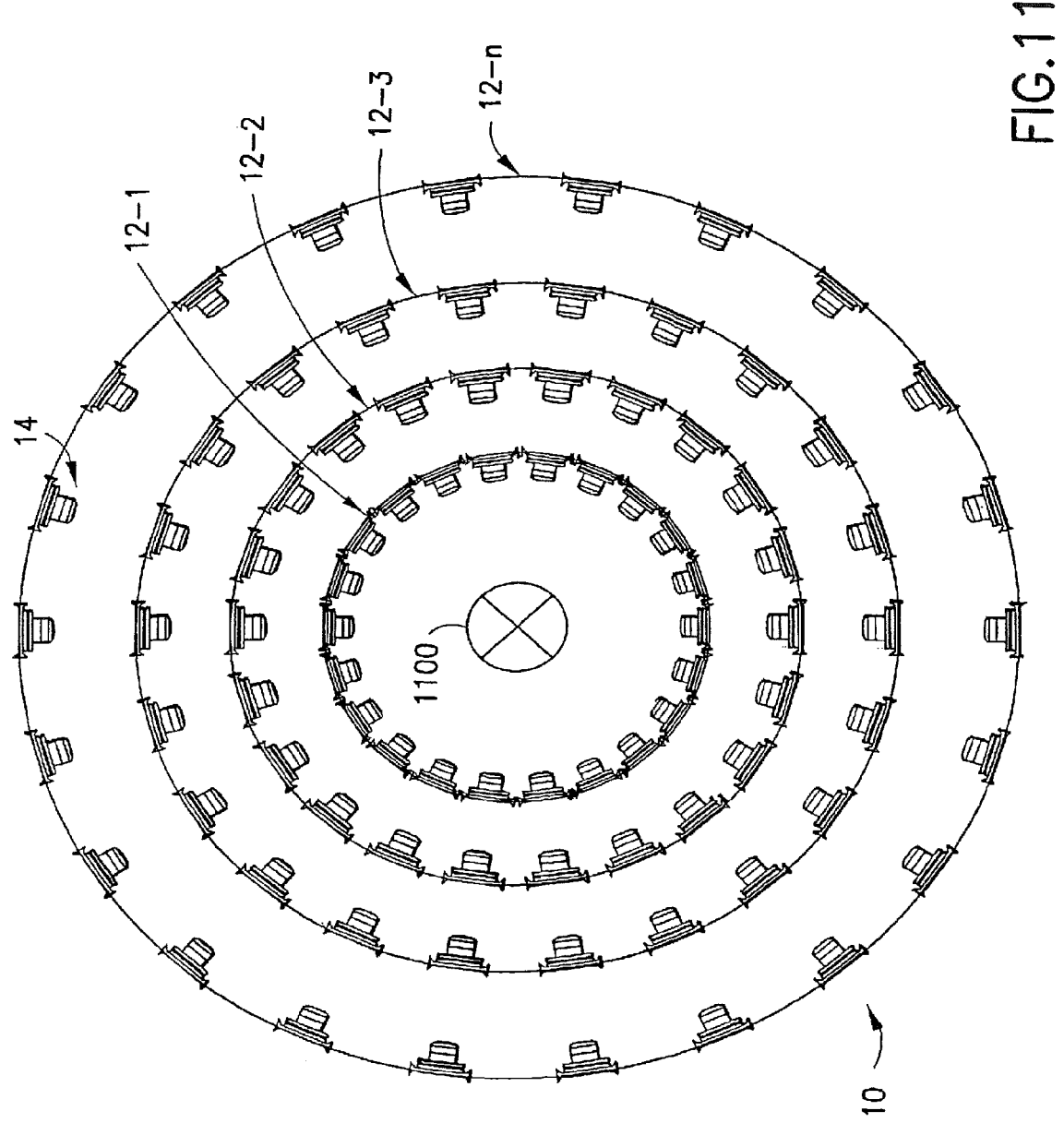
FIG. 11 is a top plan view of an alternate embodiment of the present invention.

FIG. 11 illustrates a top plan view of another embodiment enabling the user to move left, right, up, down, forward or backwards through the environment. A plurality of cylindrical arrays (121-1-121-n) of differing diameters comprising a series of cameras 14 may be situated around an environment comprising one or more objects 1200, one cylindrical array at a time. Cameras 14 situated around the object(s) 1100 are positioned along an X and Z coordinate system. Accordingly, an array 12 may comprise a plurality of rings of the same circumference positioned at different positions (heights) throughout the z-axis to form a cylinder of cameras 14 around the object(s) 1100. This also allows each camera in each array 12 to have an associated, unique storage node address comprising an X and Z coordinate—i.e., array$_1$(X, Z). In the present embodiment, for example, a coordinate value corresponding to an axis of a particular camera represents the number of camera positions along that axis the particular camera is displaced from a reference camera. In the present embodiment, from the user's perspective, the X axis runs around the perimeter of an array 12, and the Z axis runs down and up. Each storage node is associated with a camera view identified by its X, Z coordinate.

As described above, the outputs of the cameras 14 are coupled to one or more servers for gathering and transmitting the outputs to the server 18.

In one embodiment, because the environment is static, each camera requires only one storage location. The camera output may be stored in a logical arrangement, such as a matrix of n arrays, wherein each array has a plurality of (X,Z) coordinates. In one embodiment, the node addresses may comprise of a specific coordinate within an array—i.e., Array$_1$(X$_n$,Z$_n$), Array$_2$(X$_n$,Z$_n$) through Array$_n$(X$_n$,Z$_n$). As described below, users can navigate the stored images in much the same manner as the user may navigate through an environment using live camera images.

Figure 12:
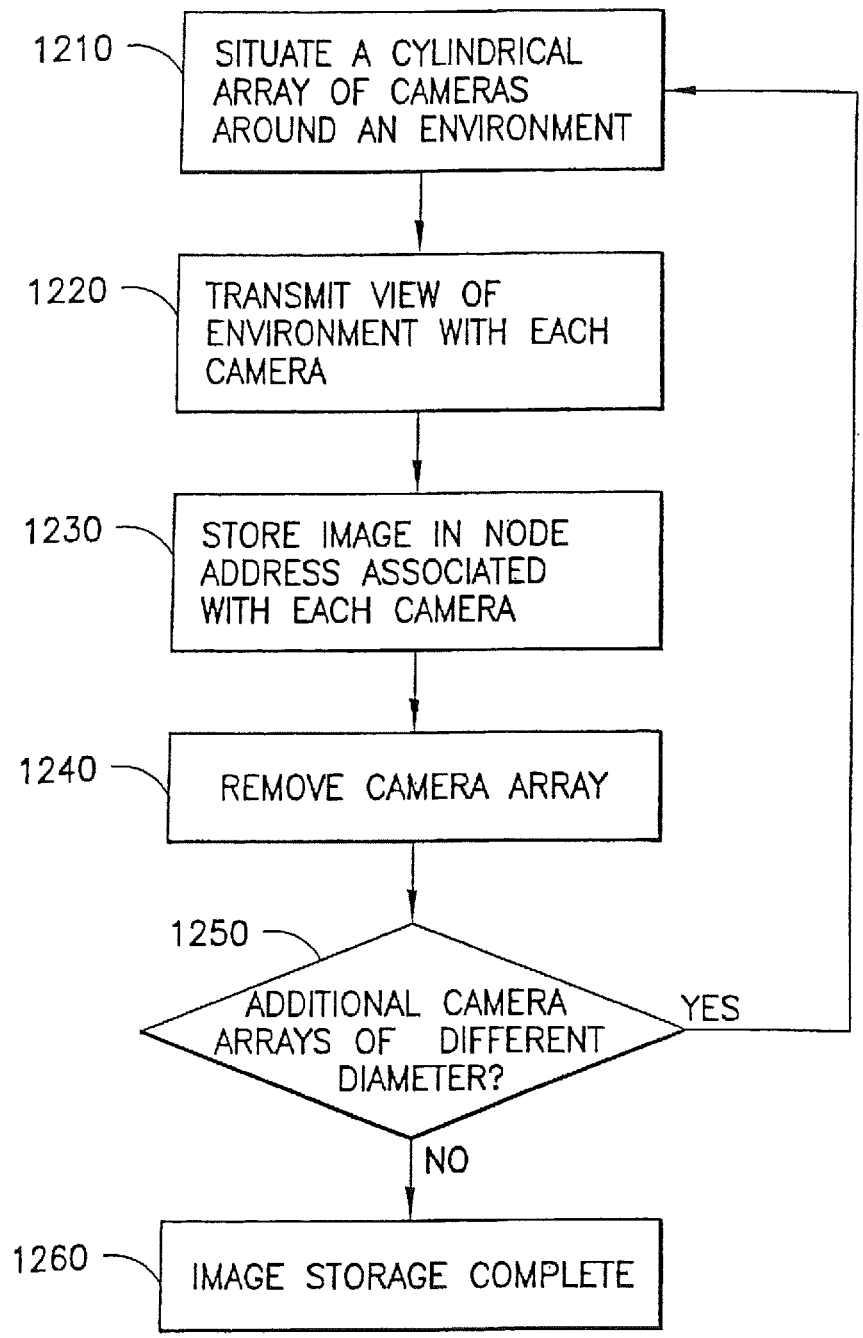
FIG. 12 is a flowchart illustrating in detail the image capture portion of the operation of the embodiment shown in FIG. 11.

The general operation of one embodiment of inputting images in storage device 20 for transmission to a user will now be described with reference to FIG. 12 and continuing reference to FIG. 11. As shown in step 1210, a cylindrical array 12-1 is situated around the object(s) located in an environment 1100. The view of each camera 14 is transmitted to server 18 in step 1220. Next, in step 1220, the electronic storage device 20 of the server 18 stores the output of each camera 14 at the storage node address associated with that camera 14. Storage of the images may be effectuated serially, from one camera 14 at a time within the array 12, or by simultaneous transmission of the image data from all of the cameras 14 of each array 12. Once the output for each camera 14 of array 12-1 is stored, cylindrical array 12-1 is removed from the environment (step 1240). In step 1250, a determination is made as to the availability of additional cylindrical arrays 12 of differing diameters to those already situated. If additional cylindrical arrays 12 are desired, the process repeats beginning with step 1210. When no additional arrays 12 are available for situating around the environment, the process of inputting images into storage devices 20 is complete (step 1260). At the end of the process, a matrix of addressable stored images exist.

Upon storing all of the outputs associated with the arrays 12-1 through 12-n, a user may navigate through the environment. Navigation is effectuated by accessing the input of the storage nodes by a user interface device 24. In the present embodiment, the user inputs generally include moving around the environment or object 1100 by moving to the left or right, moving higher or lower along the z-axis, moving through the environment closer or further from the object 1100, or some combination of moving around and through the environment. For example, a user may access the image stored in the node address Array$_3$(0,0) to view an object from the camera previously located at coordinate (0,0) of Array$_3$. The user may move directly forward, and therefore closer to the object 1100, by accessing the image stored in Array$_2$(0,0) and then Array$_1$(0,0). To move further away from the object and to the right and up, the user may move from the image stored in node address Array$_1$(0,0) and access the images stored in node address Array$_2$(1,1), followed by accessing the image stored in node address Array$_3$(2,2), an so on. A user may, of course, move among arrays and/or coordinates by any increments changing the point perspective of the environment with each node. Additionally, a user may jump to a particular camera view of the environment. Thus, a user may move throughout the environment in a manner similar to that described above with respect to accessing output of live cameras. This embodiment, however, allows user to access images that are stored in storage nodes as opposed to accessing live cameras. Moreover, this embodiment provides a convenient system and method to allow a user to move forward and backward in an environment.

It should be noted that although each storage node is associated with a camera view identified by its X, Z coordinate of a particular array, other methods of identifying camera views and storage nodes can be used. For example, other coordinate systems, such as those noting angular displacement from a fixed reference point as well as coordinate systems that indicate relative displacement from the current camera node may be used. It should also be understood that the camera arrays 12 may be other shapes other than cylindrical. Moreover, it is not essential, although often advantageous, that the camera arrays 12 surround the entire environment.

It is to be understood that the foregoing user inputs, namely, move clockwise, move counter-clockwise, up, down, closer to the environment, and further from the environment, are merely general descriptions of movement through the environment. Although the present invention is not so limited, in the present preferred embodiment, movement in each of these general directions is further defined based upon the user input. Moreover the output generated by the server to the user may be mixed when moving among adjacent storage nodes associated with environment views (along the x axis, z axis, or among juxtaposed arrays) to generate seamless movement throughout the environment. Mixing may be accomplished by, but are not limited to, the processes described above.

Embodiments Covered

Although the present invention has been described in terms of certain preferred embodiments, other embodiments that are apparent to those of ordinary skill in the art are also intended to be within the scope of this invention. Accordingly, the scope of the present invention is intended to be limited only by the claims appended hereto.

What is claimed is:

1. A system for providing at least a first user with a first view of multiple locations through a remote environment and a second user with a second view of multiple locations through the environment, the first view being different than the second view, the system comprising:
   one or more electronic storage devices;
   one or more processing elements configured to:
   receive, from a first user interface device associated with the first user, first user inputs associated with the first view through the environment;
   receive, from a second user interface device associated with the second user, second user inputs associated with the second view through the environment;
   store electronic imagery of progressively different perspectives of the environment having overlapping fields of view in the one or more electronic storage devices;
   generate mosaic imagery from the electronic imagery of the environment;
   based on the first user inputs, sequentially provide to the first user interface device mosaic imagery along the first view, thereby allowing the first user to navigate along the first view of the environment;
   based on the second user inputs, sequentially provide to the second user interface device mosaic imagery along the second view, thereby allowing the first user and second user to navigate simultaneously and independently along the first view and second view of the environment, respectively.

2. The system of claim 1, wherein the one or more processing elements are configured to generate the mosaic imagery by:
   aligning electronic imagery of the environment having overlapping fields of view; and
   processing electronic imagery, including by performing merging, fusing, filtering or output enhancement.

3. The system of claim 1, wherein the one or more processing elements are configured to generate the mosaic imagery in response to first user input.

4. The system of claim 1, wherein the one or more processing elements are configured to generate the mosaic imagery from electronic imagery of a predetermined number of overlapping fields of view and then provide the mosaic imagery to the first user interface device in response to first user input.

5. The system of claim 1, wherein the one or more processing elements are configured to cause imagery to be mixed to smooth the first user's navigation along the first view from a first perspective to a second perspective, and to be provided to the first user interface device in response to first user inputs, wherein the mixing includes:
   providing the first user interface device with imagery from one or more perspectives intermediate to the first and second perspectives;
   warping imagery of the first perspective of the environment toward imagery of the second perspective of the environment;
   adding motion blur to imagery of the environment;
   compositing imagery of the first perspective of the environment and imagery of the second perspective of the environment; or
   dissolving imagery of the first and second perspectives of the environment.

6. The system of claim 1, wherein the one or more processing elements are further configured to cause imagery of two or more different perspectives along the first view to be tweened to smooth navigation of the first user along the first view; and
   in response to first user inputs, provide the tweened imagery to the first user interface device.

7. The system of claim 6, wherein the tweening uses local scene characteristics of the environment.

8. The system of claim 1, wherein the one or more processing elements are further configured to:
   in response to first user inputs, composite additional source output with imagery of the environment and provide to the first user interface device the composited additional source output and imagery.

9. The system of claim 1, wherein:
   the one or more electronic storage devices stores electronic imagery of the environment captured from sequentially positioning electronic cameras having overlapping fields of view at each of a plurality of progressively different locations of the environment along the first view;
   the one or more processing elements are configured to generate mosaic imagery from the electronic imagery of the environment captured at the plurality of progressively different locations along the first view, each of the mosaic imagery being generated from electronic imagery captured at a different one of the plurality of progressively different locations along the first view; and
   the one or more processing elements are configured to, based on the first user inputs, sequentially provide to the first user interface device imagery of two or more of the progressively different locations along the first view.

10. The system of claim 1, wherein
    the first user interface device includes a first display device and the second user interface device includes a second display device and wherein the first and second interface devices and first and second display devices are different types of devices; and
    the one or more processing elements are configured to receive the first user inputs from the first user interface device, via a first communication link, and receive the second user inputs from the second user interface device, via a second communication link, wherein the first communication link is a different type than the second communication link.

11. The system of claim 1, wherein the one or more processing elements are configured to mix imagery and wherein the one or more processing elements include a processing element on the first user interface device.

12. The system of claim 1, wherein the one or more electronic storage devices stores output of a data device other than a camera and the one or more processing elements are further configured to provide the mosaic imagery to the first user interface device based on both first user inputs and the output of the data device.

13. A method of providing at least a first user with a first view through a remote environment, the method comprising:
   receiving, from a first user interface device associated with the first user, first user inputs associated with viewing the environment along the first view;
   generating mosaic imagery from electronic imagery of the environment having overlapping fields of view;
   based on the first user inputs associated with viewing the environment along the first view through the environment, sequentially providing to the first user interface device mosaic imagery of progressively different locations along the first view, thereby allowing a first user to navigate along the first view of the environment.

14. The method of claim 13, wherein the method is for providing the first user with the first view of the environment and a second user with a second view of the environment, the method further comprising:
receiving, from a second user interface device associated with the second user, second user inputs associated with viewing the environment along the second view; and
based on the second user inputs associated with viewing the environment along a second view of the environment, providing to the second user interface device mosaic imagery of progressively different locations along the second view, the first view being different than the second view, thereby allowing the first user and second user to navigate simultaneously and independently along the first and second views of the environment, respectively.

15. The method of claim 13, wherein generating the mosaic imagery includes:
aligning electronic imagery having overlapping fields of view; and
processing electronic imagery, including by performing merging, fusing, filtering or output enhancement.

16. The method of claim 13, wherein generating the mosaic imagery includes generating the mosaic imagery in response to first user input.

17. The method of claim 13, wherein:
generating the mosaic imagery includes generating the mosaic imagery from electronic imagery of a predetermined number of overlapping fields of view; and
providing the mosaic imagery includes providing the mosaic imagery along the first view in response to first user input.

18. The method of claim 13, wherein the method comprises:
smoothing the first user's navigation along the first view from a first perspective to a second perspective by providing the first user interface device with imagery from one or more perspectives intermediate to the first and second perspectives.

19. The method of claim 13, wherein the method comprises:
smoothing navigation of the first user along the first view by tweening imagery of two or more different perspectives along the first view; and
in response to first user input, provide the tweened imagery to the first user interface device.

20. The method of claim 19, wherein the tweening uses local scene characteristics of the environment.

21. The method of claim 13, wherein the method comprises:
smoothing navigation by the first user along the first view by mixing imagery of two or more different perspectives along the first view, the mixing including warping of imagery of one perspective of the environment towards imagery of another perspective of the environment along the first view; and
in response to first user inputs, providing the mixed imagery to the first user interface device.

22. The method of claim 13, wherein the method comprises:
smoothing navigation by the first user along the first view by mixing imagery of different perspectives along the first view, the mixing including adding motion blur to imagery of the environment along the first view; and
in response to first user input, providing the mixed imagery to the first user interface device.

23. The method of claim 13, wherein the method comprises:
smoothing navigation by the first user along the first view by mixing imagery of different perspectives along the first view, the mixing including compositing imagery of the different perspectives of the environment along the first view; and
in response to first user input, providing the mixed imagery to the first user interface device.

24. The method of claim 13, wherein the method comprises:
smoothing navigation of the first user along the first view by mixing imagery of different perspectives along the first view, the mixing including dissolving imagery of the different perspectives of the environment along the first view; and
in response to first user input, provide the mixed imagery to the first user interface device.

25. The method of claim 13, wherein the method comprises:
in response to first user input, compositing additional source output with imagery of the environment and providing to the first user interface device the composited additional source output and imagery.

26. The method of claim 13, wherein the method comprises:
receiving a first user input to transition from imagery of the environment to additional source output; and
in response to the first user input to transition to additional source output, providing the additional source output instead of the imagery of the environment to the first user interface device.

27. The method of claim 13, wherein the method comprises:
storing electronic imagery of the environment captured from sequentially positioning electronic cameras having overlapping fields of view at each of a plurality of progressively different locations of the environment along the first view;
generating mosaic imagery from the electronic imagery of the environment captured at the plurality of progressively different locations along the first view, each of the mosaic imagery being generated from electronic imagery captured at a different one of the plurality of progressively different locations along the first view; and
based on the first user inputs, sequentially providing to the first user interface device mosaic imagery of two or more of the progressively different locations along the first view.

28. The method of claim 14 wherein the first user interface device includes a first display device and the second user interface device includes a second display device and wherein the first and second interface devices and first and second display devices are different types of devices;
the method including receiving the first user inputs from the first user interface device, via a first communication link, and receiving the second user inputs from the second user interface device, via a second communication link, wherein the first communication link is a different type than the second communication link.

29. The method of claim 13, further comprising causing mixing of imagery at the first user interface device.

30. The method of claim 13, wherein the method comprises:

storing output of a data device other than a camera and providing the mosaic imagery to the first user interface device based on both first user inputs and the output of the data device.

* * * * *